US012631949B2

(12) United States Patent     (10) Patent No.:   US 12,631,949 B2
Hsieh et al.                 (45) Date of Patent:     May 19, 2026

(54) LIGHT SOURCE MODULE AND PROJECTION APPARATUS

(71) Applicant: Coretronic Corporation, Hsin-Chu (TW)

(72) Inventors: Wan-Ting Hsieh, Hsin-Chu (TW); Chun-Ju Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 339 days.

(21) Appl. No.: 18/406,228

(22) Filed: Jan. 8, 2024

(65) Prior Publication Data

US 2024/0231207 A1     Jul. 11, 2024

(30) Foreign Application Priority Data

Jan. 9, 2023   (CN) .......................... 202310026145.8

(51) Int. Cl.
    *G03B 21/20*        (2006.01)
    *G02B 27/14*        (2006.01)

(52) U.S. Cl.
    CPC ......... *G03B 21/2033* (2013.01); *G02B 27/14* (2013.01); *G03B 21/2013* (2013.01)

(58) Field of Classification Search
    CPC .................. G03B 21/00–64; G02B 27/00–648
    See application file for complete search history.

(56) References Cited

U.S. PATENT DOCUMENTS

| | | | | |
|---|---|---|---|---|
| 2017/0097562 A1* | 4/2017 | Wu | ........................ | G03B 21/20 |
| 2022/0004090 A1* | 1/2022 | Tian | .................... | G03B 21/2033 |

FOREIGN PATENT DOCUMENTS

| | | |
|---|---|---|
| CN | 203217229 | 9/2013 |
| CN | 103913937 | 4/2016 |
| TW | 202224295 | 6/2022 |

\* cited by examiner

*Primary Examiner* — Christopher A Lamb, II
(74) *Attorney, Agent, or Firm* — JCIPRNET

(57) ABSTRACT

A light source module includes a first to a fourth laser diode array and a first light combiner to a third light combiner. The first light combiner includes a plurality of first transmissive regions and a plurality of first reflective regions arranged in an alternate order along a first arrangement direction to guide a first light and a second light to the second light combiner. The second light combiner includes a plurality of second transmissive regions and a plurality of second reflective regions arranged in the alternate order along a second arrangement direction to guide first light to a third light to the third light combiner. The third light combiner includes a plurality of third transmissive regions and a third reflective region to guide the first to fourth light to be transmitted in the second direction.

26 Claims, 13 Drawing Sheets

LIGHT SOURCE MODULE AND PROJECTION APPARATUS

CROSS-REFERENCE TO RELATED APPLICATION

This application claims the priority benefit of China application serial no. 202310026145.8, filed on Jan. 9, 2023. The entirety of the above-mentioned patent application is hereby incorporated by reference herein and made a part of this specification.

BACKGROUND

Technical Field

The disclosure relates to an optical module and an electronic device, in particular to a light source module and a projection apparatus.

Description of Related Art

A projection apparatus is a display apparatus used to generate large-size images. With the evolution and innovation of technology, the design of the projection apparatus has been continuously improved. An imaging principle of the projection apparatus is to convert an illumination light generated by an illumination system into an image light through a light valve, and then project the image light through a projection lens to form a projection image on a projection target (such as a screen, an electronic whiteboard or a wall). In addition, the light source used in the illumination system has evolved from ultra-high-performance lamp (UHP lamp), light-emitting diode (LED), to the most advanced laser diode (LD) light source, in line with the market's requirements for brightness, color saturation, service life, non-toxic environmental protection, etc. There are even multiple laser diode chip packaged light sources, which are used to make the internal configuration of projection apparatus more compact and have better optical performance.

However, in the architecture of the multiple laser diode chip packaged light source, when multiple different packaged light sources are arranged side by side, there would be uneven or asymmetric light spot generation and other undesirable imaging phenomena. In this case, the conversion efficiency of the wavelength conversion device would be reduced, causing optimization difficulties, and additional lens elements or increased volume are required to improve the situation.

The information disclosed in this Background section is only for enhancement of understanding of the background of the described technology and therefore it may contain information that does not form the prior art that is already known to a person of ordinary skill in the art. Information disclosed in the Background section does not mean that one or more problems to be resolved by one or more embodiments of the disclosure was acknowledged by a person of ordinary skill in the art.

SUMMARY

The disclosure provides a light source module and a projection apparatus, which may have effectively a uniform light intensity distribution of the light incident to a wavelength conversion element.

Other purposes and advantages of the disclosure can be further understood from the technical features disclosed in the disclosure.

In order to achieve one or part or all of the above objectives or other objectives, the disclosure provides a light source module including a first laser diode array, a second laser diode array, a third laser diode array, a fourth laser diode array, a first light combiner, a second light combiner, and a third light combiner. The first laser diode array, the second laser diode array, the third laser diode array, and the fourth laser diode array are arranged in a first direction. The first laser diode array provides a first light. The second laser diode array provides a second light. The third laser diode array provides a third light. The fourth laser diode array provides a fourth light. The first light combiner includes a plurality of first transmissive regions and a plurality of first reflective regions arranged in an alternate order along a first arrangement direction. The first transmissive regions are configured to allow the first light from the first laser diode array to pass through. The first reflective regions are configured to reflect the second light from the second laser diode array to the second light combiner. The second light combiner includes a plurality of second transmissive regions and a plurality of second reflective regions arranged in the alternate order along a second arrangement direction. The second transmissive regions are configured to allow the first light and the second light from the first light combiner to pass through. The second reflective regions are configured to reflect the third light from the third laser diode array to the third light combiner. The third light combiner includes a plurality of third transmissive regions and a third reflective region distributed between the third transmissive regions. The third transmissive regions are arranged in an array in a plane formed by the first arrangement direction and the second arrangement direction. The third transmissive regions are configured to allow the fourth light from the fourth laser diode array to pass through and be transmitted in a second direction. The third reflective region is configured to reflect the first light to the third light from the second light combiner to be transmitted in the second direction. The first direction is perpendicular to the second direction, and the first arrangement direction is perpendicular to the second arrangement direction.

In order to achieve one or part or all of the above objectives or other objectives, the disclosure provides a light source module including a first laser diode array, a second laser diode array, a third laser diode array, a fourth laser diode array, a first light combiner, a second light combiner, and a third light combiner. The first laser diode array and the fourth laser diode array are arranged parallel to a second direction, and the second laser diode array and the third laser diode array are arranged parallel to a first direction. The first laser diode array provides a first light. The second laser diode array provides a second light. The third laser diode array provides a third light. The fourth laser diode array provides a fourth light. The first light combiner includes a plurality of first transmissive regions and a plurality of first reflective regions arranged in an alternate order along a first arrangement direction. The first transmissive regions are configured to allow the first light from the first laser diode array to pass through, and the first reflective regions are configured to reflect the second light from the second laser diode array to the third light combiner. The second light combiner includes a plurality of second transmissive regions and a plurality of second reflective regions arranged in the alternate order along a second arrangement direction. The second transmissive regions are configured to allow the third light from the third laser diode array to pass through to the third light combiner, and the second reflective regions are configured to reflect the fourth light from the fourth laser diode array to the third light combiner. The third light combiner includes a plurality of third transmissive regions and a third reflective region distributed between the third transmissive regions. The third transmissive regions are arranged in an array in a plane formed by the first arrangement direction and the second arrangement direction. The third transmissive regions are configured to allow the third light and the fourth light from the second light combiner to pass through and be transitted in the second direction. The third reflective region is configured to reflect the first light and the second light from the first light combiner to be transmitted in the second direction. The first direction is perpendicular to the second direction, and the first arrangement direction is perpendicular to the second arrangement direction.

In order to achieve one or part or all of the above objectives or other objectives, the disclosure further provides a projection apparatus including an illumination system, at least one light valve, and a projection lens. The illumination system is for providing an illumination light. The illumination system includes a light source module. The light source module includes a first laser diode array, a second laser diode array, a third laser diode array, a fourth laser diode array, a first light combiner, a second light combiner, and a third light combiner. The first laser diode array, the second laser diode array, the third laser diode array, and the fourth laser diode array are arranged in a first direction. The first laser diode array provides a first light. The second laser diode array provides a second light. The third laser diode array provides a third light. The fourth laser diode array provides a fourth light. The first light combiner includes a plurality of first transmissive regions and a plurality of first reflective regions arranged in an alternate order along a first arrangement direction. The first transmissive regions are configured to allow the first light from the first laser diode array to pass through. The first reflective regions are configured to reflect the second light from the second laser diode array to the second light combiner. The second light combiner includes a plurality of second transmissive regions and a plurality of second reflective regions arranged in an alternate order along a second arrangement direction. The second transmissive regions are configured to allow the first light and the second light from the first light combiner to pass through. The second reflective regions are configured to reflect the third light from the third laser diode array to the third light combiner. The third light combiner includes a plurality of transmissive regions and a third reflective region distributed between the third transmissive regions. The third transmissive regions are arranged in an array in a plane formed by the first arrangement direction and the second arrangement direction. The third transmissive regions are configured to allow the fourth light from the fourth laser diode array to pass through and be transmitted in a second direction. The third reflective region is configured to reflect the first light to the third light from the second light combiner to be transmitted in the second direction. The first direction is perpendicular to the second direction, and the first arrangement direction is perpendicular to the second arrangement direction. The illumination light includes at least one of the first light to the fourth light from the third light combiner. The at least one light valve is disposed on a transmission path of the illumination light for converting the illumination light into an image light. The projection lens is disposed on a transmission path of the image light for projecting the image light out of the projection apparatus.

In order to achieve one or part or all of the above objectives or other objectives, the disclosure further provides a light source module including a first laser diode array, a second laser diode array, a third laser diode array, a first light combiner, and a second light combiner. The first laser diode array, the second laser diode array, and the third laser diode array are arranged in a first direction, the first laser diode array provides a first light, the second laser diode array provides a second light, and the third laser diode array provides a third light. The first light combiner includes a plurality of first transmissive regions and a plurality of first reflective regions arranged in an alternate order along a first arrangement direction. The first transmissive regions are configured to allow the first light from the first laser diode array to pass through, and the first reflective regions are configured to reflect the second light from the second laser diode array to the second light combiner. The second light combiner includes a plurality of second transmissive regions and a plurality of second reflective regions arranged in an alternate order along a second arrangement direction. The second transmissive regions are configured to allow the third light from the third laser diode array to pass through, and the second reflective regions are configured to reflect the first light and the second light from the first light combiner. The first light, the second light and the third light are guided by the second light combiner to be transmitted in a second direction. The first direction is perpendicular to the second direction, and the first arrangement direction is perpendicular to the second arrangement direction.

Based on the above, the embodiments of the disclosure have at least one of the following advantages or functions. In the light source module and the projection apparatus of the disclosure, the first light combiner includes a plurality of first transmissive regions and a plurality of first reflective regions arranged in an alternate order along the first arrangement direction. The second light combiner includes a plurality of second transmissive regions and a plurality of second reflective regions arranged in the alternate order along the second arrangement direction. The third light combiner includes a plurality of third transmissive regions and a third reflective region distributed between the third transmissive regions. The third transmissive regions are arranged in an array in a plane formed by the first arrangement direction and by the second arrangement direction. Therefore, in one embodiment, the first light and the second light may be sequentially transmitted to the first light combiner, the second light combiner, and the third light combiner, the third light is sequentially transmitted to the second light combiner and the third light combiner, the fourth light is transmitted to the third light combiner, and the first light to the fourth light are transmitted to the reference plane by the third light combiner to form evenly distributed light spots.

Alternatively, in another embodiment, the first light and the second light may be sequentially transmitted to the first light combiner and the third light combiner, the third light and the fourth light are sequentially transmitted to the second light combiner and the third light combiner, and the first light, the second light, the third light, and the fourth light are transmitted to the reference plane by the third light combiner to form evenly distributed light spots. Alternatively, in another embodiment, the first light and the second light may be sequentially transmitted to the first light combiner and the second light combiner, the third light is transmitted to the second light combiner, and the first light to the third light are transmitted to the reference plane by the second light combiner to form evenly distributed light spots. In this way, the distribution of light spots on the reference plane from the first light to the fourth light may be evened out, so that the configuration of the laser diode arrays which are configured to form the combined light spots may be equivalent to a surface light source. Therefore, the light intensity distribution of the first light to the fourth light incident on the wavelength conversion element is uniform.

Other objectives, features and advantages of the disclosure will be further understood from the further technological features disclosed by the embodiments of the disclosure wherein there are shown and described preferred embodiments of this disclosure, simply by way of illustration of modes suit to best out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a schematic diagram of a light source module according to an embodiment of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations herein is meant to encompass the items listed thereafter and equivalents thereof as well as additional items. Unless limited otherwise, the terms "connected," "coupled," and "mounted" and variations therein are used broadly and encompass direct and indirect connections, couplings, and mountings. Similarly, the terms "facing," "faces" and variations therein are used broadly and encompass direct and indirect facing, and "adjacent to" and variations therein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
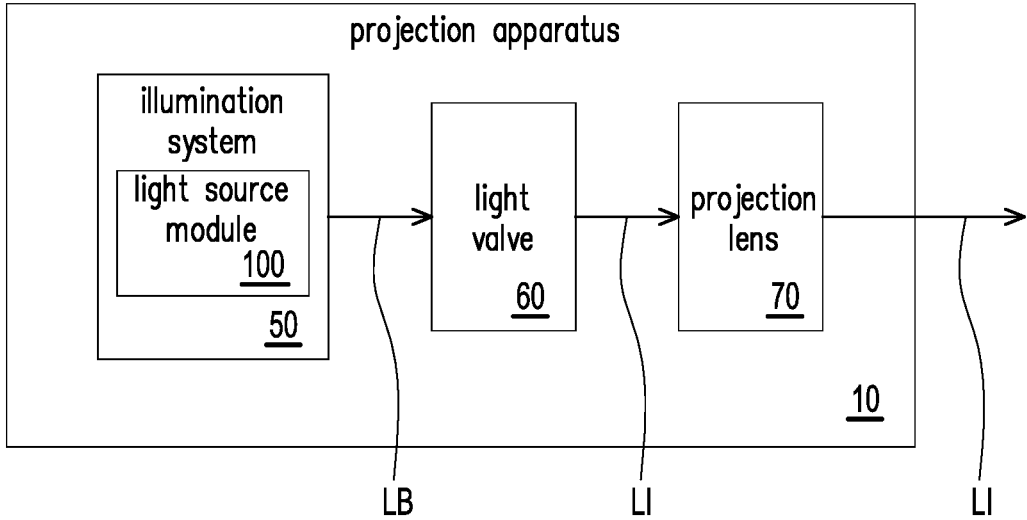
FIG. 1 is a schematic diagram of a projection apparatus according to an embodiment of the disclosure.

FIG. 1 is a schematic diagram of a projection apparatus according to an embodiment of the disclosure. Referring to FIG. 1, this embodiment provides a projection apparatus 10 including an illumination system 50, at least one light valve 60, and a projection lens 70. The illumination system 50 is for providing an illumination light LB. The at least one light valve 60 is disposed on a transmission path of the illumination light LB transmitted from the illumination system 50, and the light valve 60 is used to convert the illumination light LB into an image light LI. The projection lens 70 is disposed on a transmission path of the image light LI transmitted from the at least one light valve 60, and is used to project the image light LI out of the projection apparatus 10 to form an image on a projection target (not shown), such as a screen, an electronic whiteboard or a wall.

In this embodiment, the illumination system 50 includes, for example, a light source module, a wavelength conversion element, a light homogenizing element, a filter element, and multiple light splitting and combining elements to provide illumination light LB with different wavelengths. The illumination light LB with different wavelengths provided to the light valve 60 forms the image light LI. The wavelength conversion element is, for example, a phosphor wheel. The light homogenizing element is, for example, an integrated rod or a flyeye lens. The filter element is, for example, a color filter wheel. However, the disclosure does not limit the type or form of the illumination system 50 in the projection apparatus 10. The detailed structure and implementation of the projection apparatus 10 may be adequately taught, recommended and illustrated by the subsequent description and the common knowledge of the technical field.

The light valve 60 is, for example, a reflective light modulator such as a liquid crystal on silicon panel (LCOS panel) or a digital micro-mirror device (DMD). In some embodiments, the light valve 60 may also be a transmissive light modulator such as a transparent liquid crystal panel, an electro-optical modulator, a magneto-optic modulator, and an acousto-optic modulator (AOM). The disclosure provides no limitation to the form and type of the light valve 60. The detailed steps and implementation of the method for the light valve 60 to convert the illumination light LB into the image light LI may be obtained from the common knowledge in the technical field with sufficient teaching, suggestion and implementation, and therefore no further description is incorporated herein. In this embodiment, the number of the light valve 60 is one, for example, the projection apparatus 10 using a single digital micro-mirror element. However, in other embodiments there may be more than one light valve, and the disclosure is not limited thereto.

The projection lens 70 includes, for example, one or a combination of multiple optical lens elements with diopter values, such as various combinations of non-planar lenses including biconcave lenses, biconvex lenses, concave-convex lenses, convex-concave lenses, plane-convex lenses, plane-concave lenses, etc. In an embodiment, the projection lens 70 may further include a plane optical lens element to project the image light LI from the light valve 60 to the projection target in a reflective manner. The disclosure does not limit the form and type of the projector lens 70.

Figure 2:
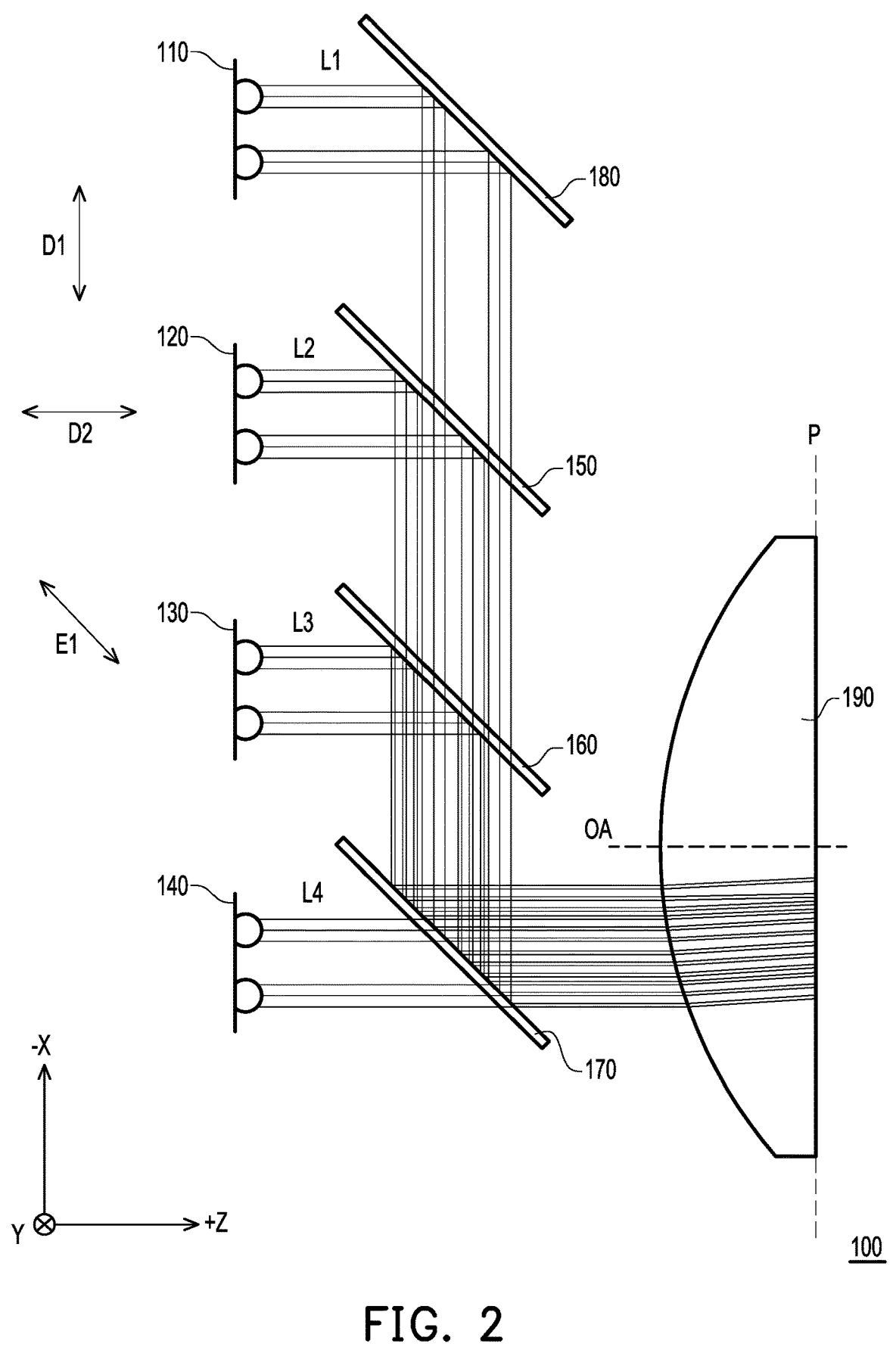

FIG. 2 is a schematic diagram of a light source module according to an embodiment of the disclosure. A light source module 100 shown in FIG. 2 may be applied at least in the illumination system 50 of the projection apparatus 10 shown in FIG. 1, which is thus illustrated below as an example. Referring to FIG. 2, the illumination system 50 includes a light source module 100, and the light source module 100 includes a first laser diode array 110, a second laser diode array 120, a third laser diode array 130, a fourth laser diode array 140, a first light combiner 150, a second light combiner 160, and a third light combiner 170. The first laser diode array 110, the second laser diode array 120, the third laser diode array 130, and the fourth laser diode array 140 are arranged in a first direction D1. The first laser diode array 110 provides a first light L1, the second laser diode array 120 provides a second light L2, the third laser diode array 130 provides a third light L3, and the fourth laser diode array 140 provides a fourth light L4. The first light combiner 150 is on a transmission path of the first light L1 and the second light L2, the second light combiner 160 is on a transmission path of the first light L1, the second light L2, and the third light L3, the third light combiner 170 is on a transmission path of the first light L1, the second light L2, the third light L3, and the fourth light L4. If defined in a Cartesian coordinate system, in this embodiment, the first direction D1 can be defined as a direction parallel to the X-axis.

Figure 3A:
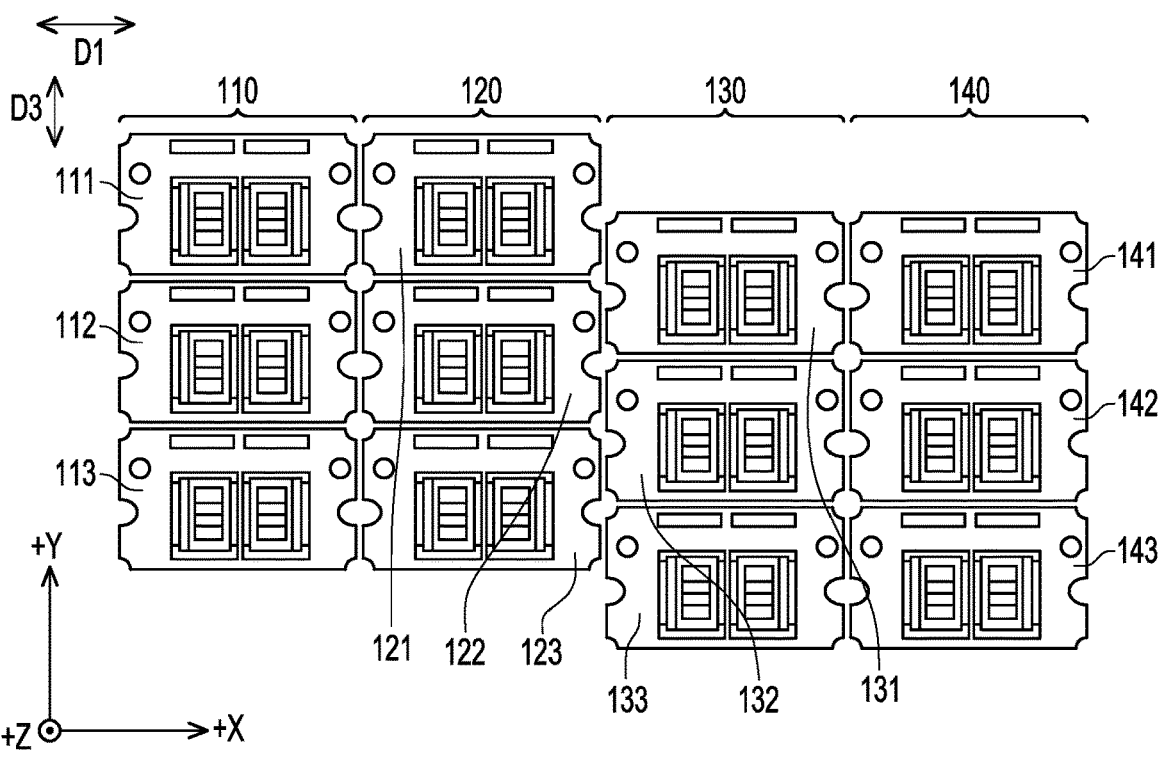
FIG. 3A and FIG. 3B are schematic diagrams of a first laser diode array to a fourth laser diode array according to different embodiments of the disclosure.
Figure 3B:
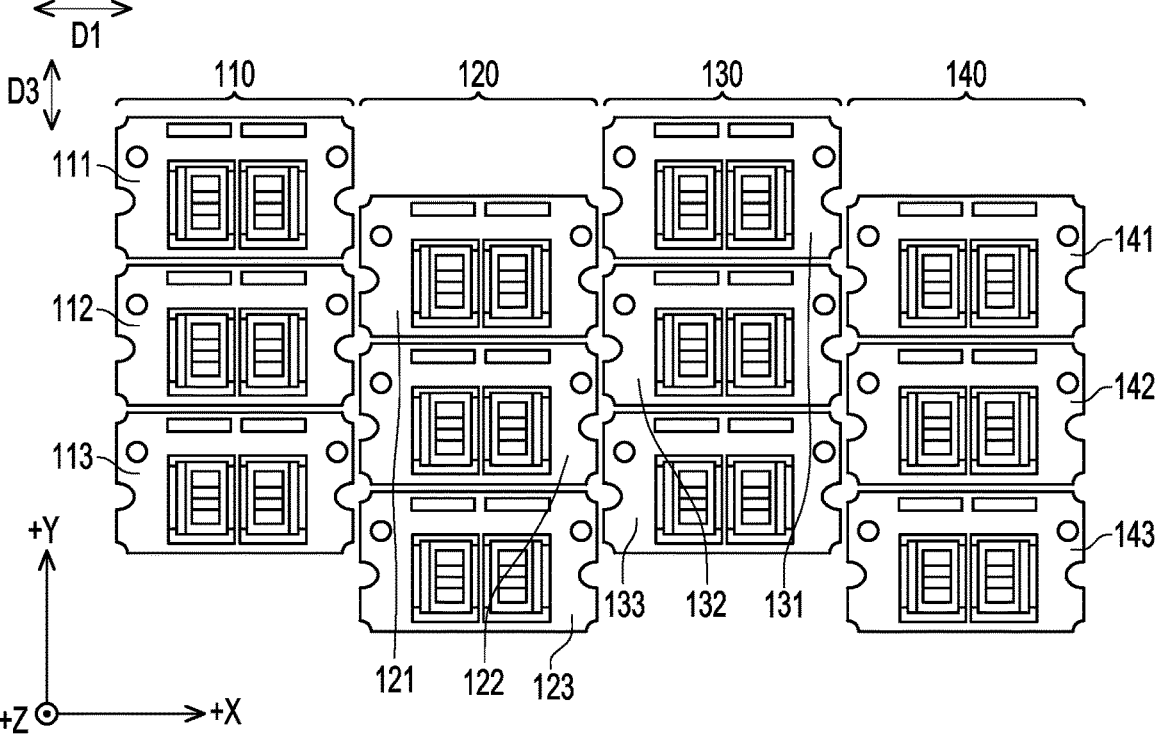
Figure 11:
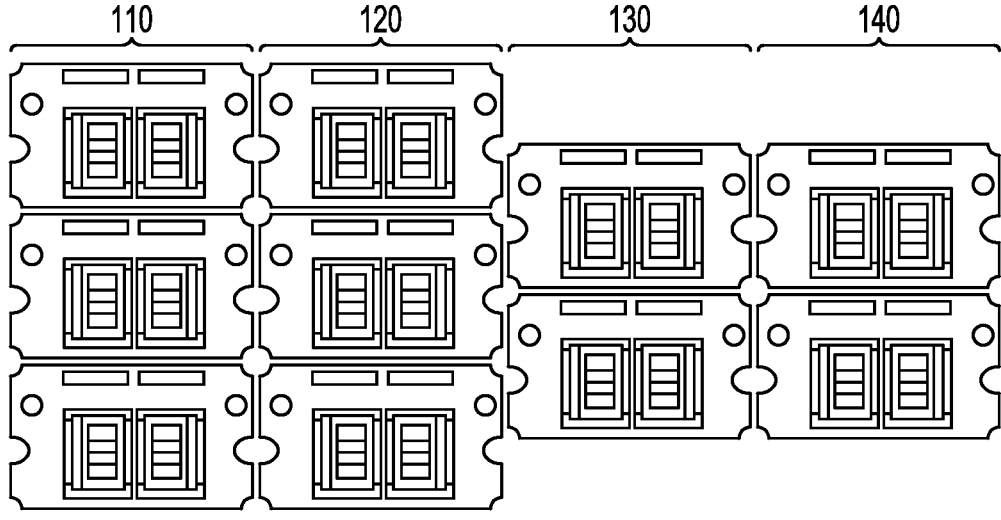
FIG. 11 is a schematic diagram of a first laser diode array to a fourth laser diode array according to another embodiment of the disclosure.

FIG. 3A and FIG. 3B are schematic diagrams of a first laser diode array to a fourth laser diode array according to different embodiments of the disclosure, and FIG. 11 is a schematic diagram of a first laser diode array to a fourth laser diode array according to another embodiment of the disclosure. The first laser diode array 110 to the fourth laser diode array 140 shown in FIG. 3A, FIG. 3B, and FIG. 11 may be applied to at least the light source module 100 shown in FIG. 2, which is thus illustrated below as an example. Referring to FIG. 2 and FIG. 3A first, in detail, the first laser diode array 110 includes a plurality of light-emitting units 111, 112, and 113 arranged and spaced apart in a direction perpendicular to the first direction D1, the second laser diode array 120 includes a plurality of light-emitting units 121, 122, and 123 arranged and spaced apart in the direction perpendicular to the first direction D1, the third laser diode array 130 includes a plurality of light-emitting units 131, 132, and 133 arranged and spaced apart in the direction perpendicular to the first direction D1, the fourth laser diode array 140 includes a plurality of light-emitting units 141, 142, and 143 arranged and spaced apart in the direction perpendicular to the first direction D1, and each of the light-emitting units 111, 112, 113, 121, 122, 123, 131, 132, 133, 141, 142, and 143 is an multiple laser diode chip package or two multiple laser diode chip packages. The multiple laser diode chip package has, for example, four or five laser diode chips arrange in the direction perpendicular to the first direction D1. In this embodiment of FIG. 3A, each of the light-emitting units 111, 112, 113, 121, 122, 123, 131, 132, 133, 141, 142, and 143 includes, for example, two multiple laser diode chip packages arranged in the first direction D1, and each of the package is equipped with, for example, four laser diode chips, i.e., each of the light-emitting units has eight laser diode chips. The first light L1 to the fourth light L4 may have the same wavelength and are, for example, blue laser light. Each laser diode chip of the multiple laser diode chip package may emits a laser beam. Therefore, the first laser diode array 110 may emits the plurality of laser beams to form the first light L1. The second laser diode array 120 may emits the plurality of laser beams to form the second light L2. The third laser diode array 130 may emits the plurality of laser beams to form the third light L3. The fourth laser diode array 140 may emits the plurality of laser beams to form the fourth light L4. However, the disclosure does not limit the types and detailed specifications of the multiple laser diode chip package. Referring to FIG. 11, the first laser diode array 110 includes three light-emitting units (not numbered) arranged and spaced apart in the direction perpendicular to the first direction D1, the second laser diode array 120 includes three light-emitting units (not numbered) arranged and spaced apart in the direction perpendicular to the first direction D1, the third laser diode array 130 includes two light-emitting units (not numbered) arranged and spaced apart in the direction perpendicular to the first direction D1, and the fourth laser diode array 140 includes two light-emitting units (not numbered) arranged and spaced apart in the direction perpendicular to the first direction D1. In other embodiments, a number of the light-emitting units in the first laser diode array 110 may be two, three, or more, a number of the light-emitting units in the second laser diode array 120 may be one, two, three, or more, a number of the light-emitting units in the third laser diode array 130 may be one, two, three, or more, and a number of the light-emitting units in the fourth laser diode array 140 may be two, three, or more. The number of the light emitting units in each of the laser diode arrays is not limited in the disclosure, but may be disposed according to the actual optical design and the design of the light combiners.

The second laser diode array 120 provides the second light L2 in a second direction D2, the third laser diode array 130 provides the third light L3 in the second direction D2, and the fourth laser diode array 140 provides the fourth light L4 in the second direction D2. The first direction D1 is perpendicular to the second direction D2. If defined in a Cartesian coordinate system, in this embodiment, the second direction D2 can be defined as a direction parallel to the Z-axis. In addition, in this embodiment, the light source module 100 further includes a reflective element 180, for example a reflector, disposed on the transmission path of the first light L1 from the first laser diode array 110 for reflecting the first light L1 to the first light combiner 150. The first laser diode array 110 provides the first light L1 in the second direction D2. However, in other embodiments, it is possible to design the first laser diode array 110 to provide the first light L1 directly to the first light combiner 150 in the first direction D1 in order to omit the configuration of the reflective element 180, and the disclosure is not limited thereto.

It should be noted that, in this embodiment of FIG. 3A, two of the first laser diode array 110 to the fourth laser diode array 140 in the direction perpendicular to the first direction D1 are staggered with the other two of the first laser diode array 110 to the fourth laser diode array 140. The direction perpendicular to the first direction D1 may be called a third direction D3. If defined in a Cartesian coordinate system, in this embodiment, the third direction D3 may be defined as a direction parallel to the Y-axis. For example, in this embodiment, the first laser diode array 110 and the second laser diode array 120 are arranged in parallel and are not misaligned in the third direction D3, the third laser diode array 130 and the fourth laser diode array 140 are arranged in parallel and are not misaligned in the third direction D3, and the first laser diode array 110 and the third laser diode array 130 are staggered with each other, i.e., there is a mutual misalignment in the third direction D3. To further illustrate, the light-emitting units 111, 112, and 113 on the first laser diode array 110 are arranged and spaced apart in the direction perpendicular to the first direction D1, the light-emitting units 131, 132, and 133 on the third laser diode array 130 are arranged and spaced apart in the direction perpendicular to the first direction D1, and the light-emitting units 131, 132, and 133 on the third laser diode array 130 corresponds in the third direction D3 to intervals between two adjacent light-emitting units 111, 112, and 113 on the first laser diode array 110. Referring to FIG. 3B, in another embodiment, it is also possible to design that the first laser diode array 110 and the third laser diode array 130 are arranged in parallel and are not misaligned in the third direction D3, the second laser diode array 120 and the fourth laser diode array 140 are arranged in parallel and are not misaligned in the third direction D3, and the first laser diode array 110 and the second laser diode array 120 are staggered with each other, i.e., there is a mutual misalignment in the third direction D3. In other words, two of the first laser diode array 110 to the fourth laser diode array 140 in the direction perpendicular to the first direction D1 are staggered with the other two of the first laser diode array 110 to the fourth laser diode array 140.

Figure 4A:
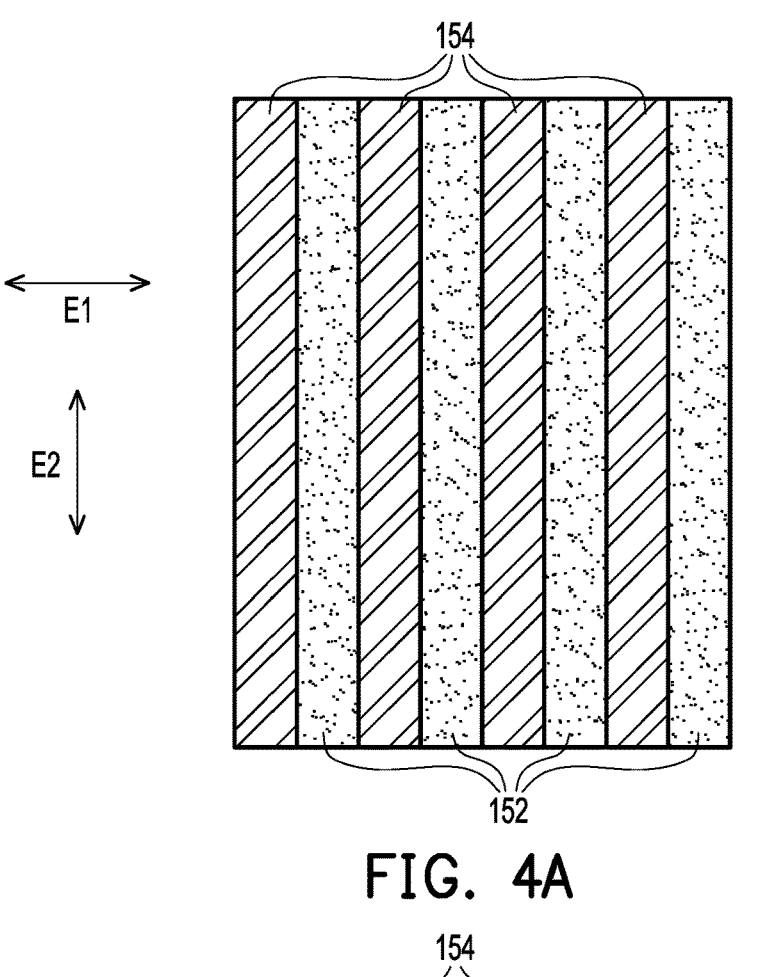
FIG. 4A and FIG. 4B are schematic diagrams of first light combiners according to different embodiments of the disclosure, respectively.
Figure 4B:
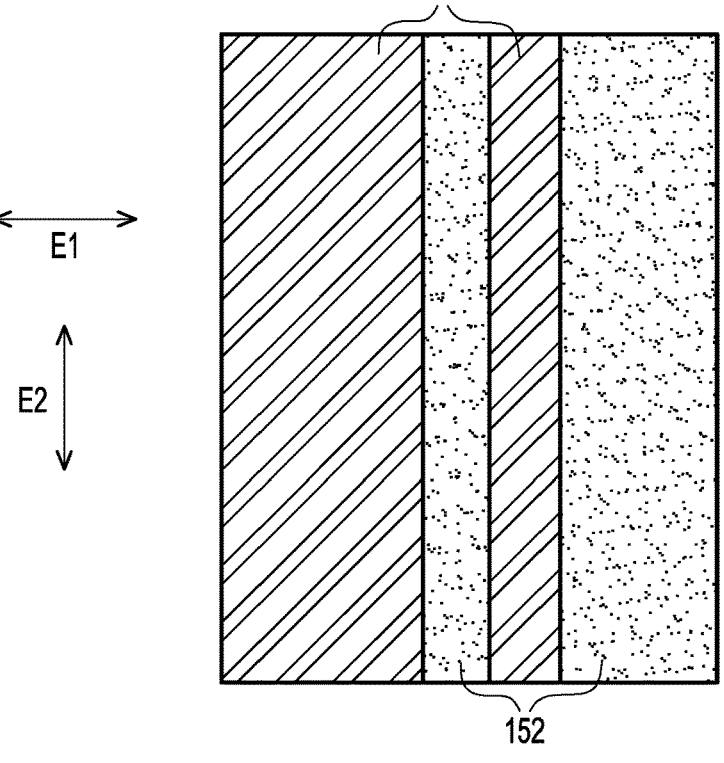

FIG. 4A and FIG. 4B are schematic diagrams of first light combiners according to different embodiments of the disclosure, respectively. The first light combiner 150 shown in FIG. 4A and FIG. 4B may be applied to at least the light source module 100 shown in FIG. 2, which is thus illustrated below as an example. Referring to FIG. 2 and FIG. 4A, the first light combiner 150 is located between the reflective element 180 and the second light combiner 160, and the first light combiner 150 includes a plurality of first transmissive regions 152 and a plurality of first reflective regions 154 arranged in an alternate order along a first arrangement direction E1. The first transmissive regions 152 are configured to allow the first light L1 from the first laser diode array 110 to pass through, and the first reflective regions 154 are configured to reflect the second light L2 from the second laser diode array 120 to the second light combiner 160. Furthermore, the plurality of laser beams of the first light L1 are configured to pass through the first transmissive regions 152, and the plurality of laser beams of the second light L2 are configured to be reflected by the first reflective regions 154 to the second light combiner 160. Specifically, each of the first reflective regions 154 and each of the first transmissive regions 152 of the first light combiner 150 extend in a second arrangement direction E2, and the first reflective regions 154 in the first arrangement direction E1 have the same width. In this embodiment, the first arrangement direction E1 is perpendicular to the second arrangement direction E2, the first arrangement direction is arranged at 45 degrees to the first direction, and the second arrangement direction E2 is perpendicular to the first direction D1 and the second direction D2. If defined in a Cartesian coordinate system, in this embodiment, the first arrangement direction E1 may be defined as being arranged at 45 degrees to a direction of the X-axis, and the second arrangement direction E2 may be defined as a direction parallel to the Y-axis. However, in another embodiment, the first arrangement direction E1 may be designed to be perpendicular to the first direction D1 and the second direction D2, and the second arrangement direction E2 is arranged at 45 degrees to the first direction D1. The disclosure is not limited thereto. If defined in a Cartesian coordinate system, that is, in another embodiment, the first arrangement direction E1 may be defined as a direction parallel to the Y-axis, and the second arrangement direction E2 is arranged at 45 degrees to the X-axis direction, and the disclosure is not limited thereto.

Referring to FIG. 4B, in a first light combiner 150A of other embodiments, the widths of the first reflective regions 154 in the first arrangement direction E1 may vary depending on the optical path and the spacing between the light-emitting units in the laser diode array, and the disclosure is not limited thereto. The disclosure does not limit the number of the first transmissive regions 152 and the first reflective regions 154. In this way, the number of the first transmissive regions 152 and the first reflective regions 154 may be omitted according to the optical path, thus reducing the production cost of the first light comber 150A.

Figure 5:
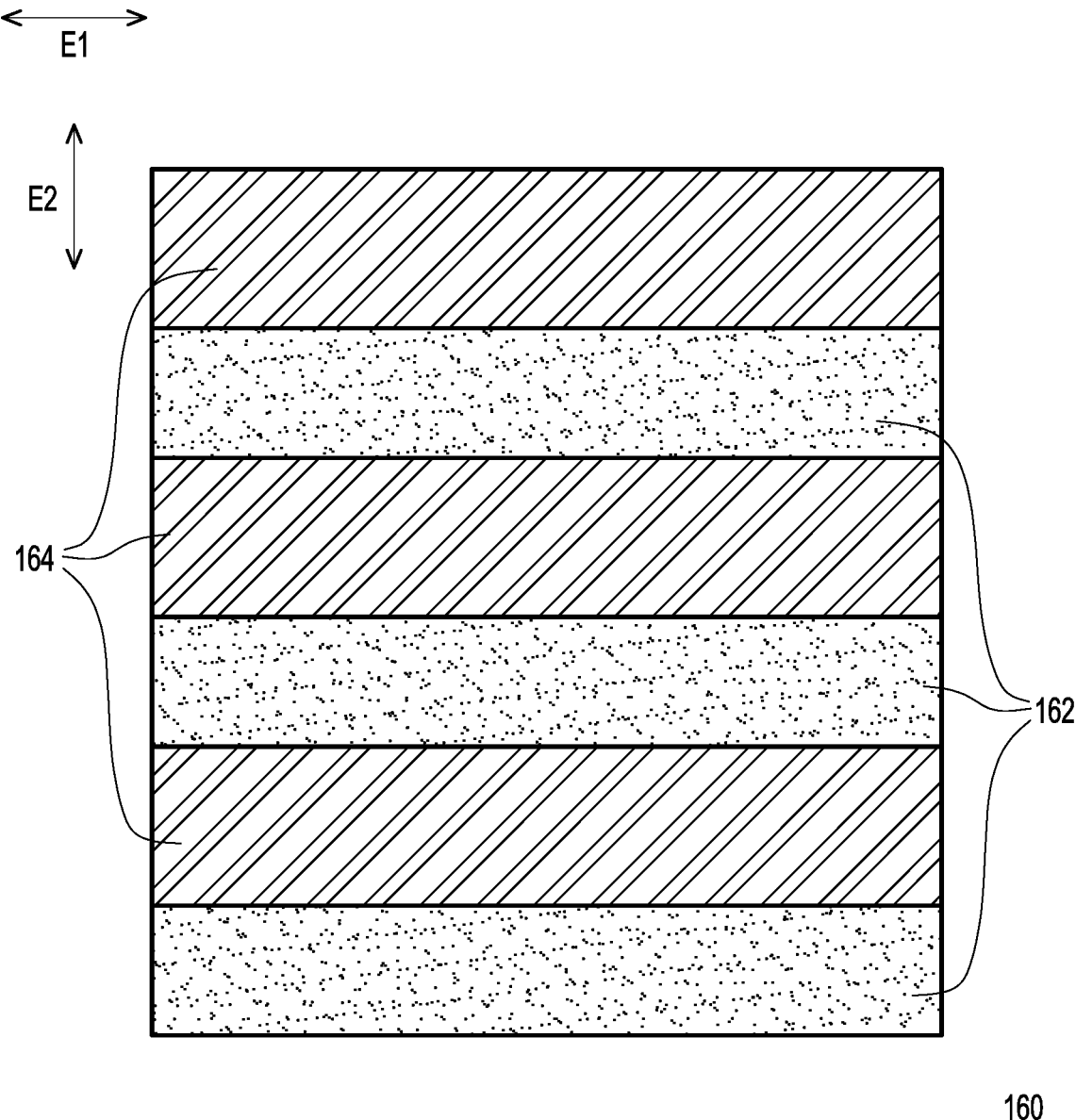
FIG. 5 is a schematic diagram of a second light combiner according to an embodiment of the disclosure.

FIG. 5 is a schematic diagram of a second light combiner according to an embodiment of the disclosure. The second light combiner 160 shown in FIG. 5 may be applied to at least the light source module 100 shown in FIG. 2, which is thus illustrated below as an example. Referring to FIG. 2 and FIG. 5, the second light combiner 160 is located between the first light combiner 150 and the third light combiner 170. The second light combiner 160 includes a plurality of second transmissive regions 162 and a plurality of second reflective regions 164 arranged in an alternate order along the second arrangement direction E2, and each of the second reflective regions 164 and each of the second transmissive regions 162 of the light combiner 160 extend in the first arrangement direction E1. The second transmissive regions 162 are configured to allow the first light L1 and the second light L2 from the first light combiner 150 to pass through. The second reflective regions 164 are configured to reflect the third light L3 from the third laser diode array 130 to the third light combiner 170. Furthermore, the plurality of laser beams of the first light L1 and the plurality of laser beams of the second light L2 are configured to pass through the second transmissive regions 162, and the plurality of laser beams of the third light L3 are configured to be reflected by the second reflective regions 164 to the third light combiner 170.

In other words, both the first light combiner 150 and the second light combiner 160 are strip beam splitters. The transmissive regions and the reflective regions are a plurality of strips arranged at each of the first light combiner 150 and the second light combiner 160. And the difference lies in that the strips of the transmissive regions and the strips of the reflective regions of the first light combiner 150 are perpendicularly to the strips of the transmissive regions and the strips of the reflective regions of the second light combiner 160. To further illustrate, in an embodiment of the disclosure, the first transmissive regions 152 and the first reflective regions 154 of the first light combiner 150 are arranged in an alternate order along the first arrangement direction E1, and the second reflective regions 164 and the second transmissive regions 162 of the second light combiner 160 are arranged in an alternate order along the second arrangement direction E2. The first arrangement direction is arranged at 45 degrees to the first direction, and the second arrangement direction E2 is perpendicular to the first direction D1 and the second direction D2. In another embodiment of the disclosure, the first transmissive regions 152 and the first reflective regions 154 of the first light combiner 150 are arranged in an alternate order along the first arrangement direction E1, and the second reflective regions 164 and the second transmissive regions 162 of the second light combiner 160 are arranged in an alternate order along the second arrangement direction E2. The first arrangement direction E1 may be designed to be perpendicular to the first direction D1 and the second direction D2, the second arrangement direction E2 is arranged at 45 degrees to the first direction D1, and the disclosure is not limited thereto.

Figure 6A:
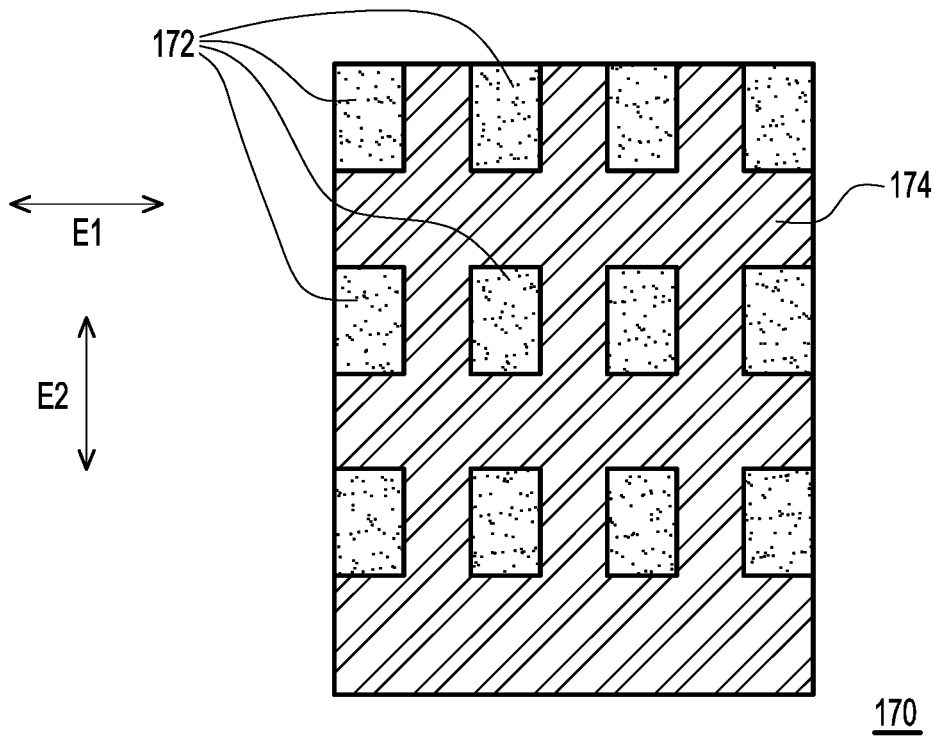
FIG. 6A and FIG. 6B are schematic diagrams of third light combiners according to different embodiments of the disclosure, respectively.
Figure 6B:
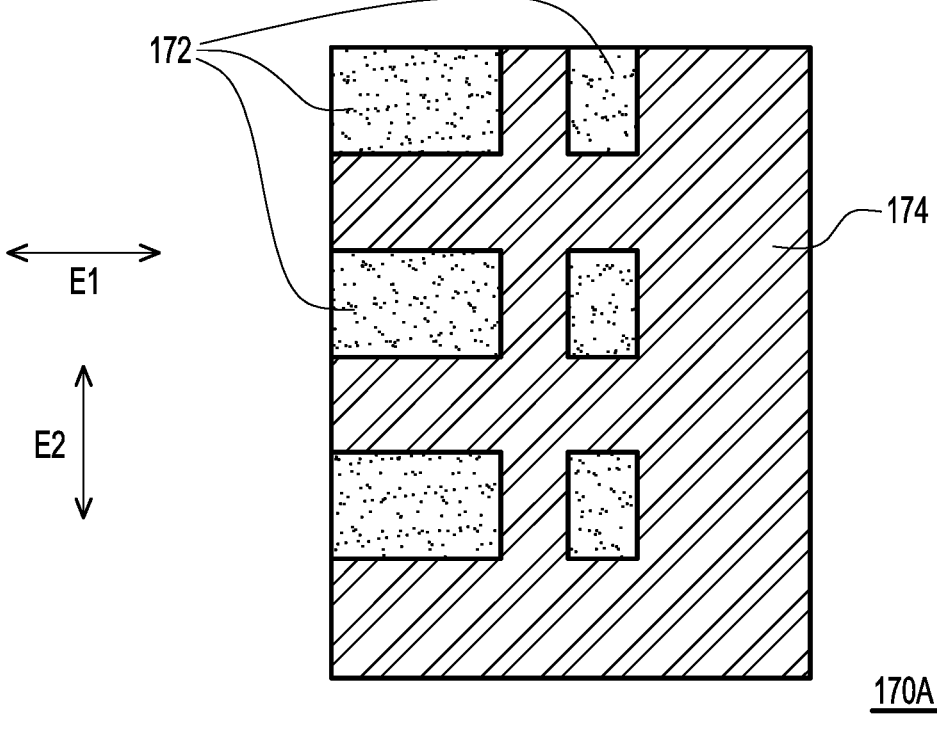

FIG. 6A and FIG. 6B are schematic diagrams of third light combiners according to different embodiments of the disclosure, respectively. The third light combiner 170 shown in FIG. 6A and FIG. 6B may be applied to at least the light source module 100 shown in FIG. 2, which is thus illustrated below as an example. Referring to FIG. 2 and FIG. 6A first, the third light combiner 170 includes a plurality of third transmissive regions 172 and a third reflective region 174 distributed between the third transmissive regions 172. The third transmissive regions 172 are arranged in an array in a plane formed by the first arrangement direction E1 and the second arrangement direction E2. The third transmissive regions 172 are arranged and spaced apart from each other, and the third reflective region 174 is disposed on the plane between the third transmissive regions 172. The third transmissive regions 172 are configured to allow the fourth light L4 from the fourth laser diode array 140 to pass through and transmit along the second direction D2. The third reflective region 174 is configured to reflect the first light L1, the second light L2, the third light L3 from the second light combiner 160, such that the first light L1, the second light L2, and the third light L3 are transmitted along the second direction D2. Furthermore, the plurality of laser beams of the first light L1, the plurality of laser beams of the second light L2 and the plurality of laser beams of the third light L3 are configured to be reflected by the third reflective region 174, and the plurality of laser beams of the fourth light L4 are configured to pass through the third transmissive regions 172. Specifically, the third light combiner 170 is a beam splitter which has the third transmissive regions 172 and the reflective region 174 formed in a checkerboard configuration, and the third transmissive regions 172 have the same width in the first arrangement direction E1.

Referring to FIG. 6B, however, in a third light combiner 170A of other embodiments, the widths of the third transmissive regions 172 in the first arrangement direction E1 may vary depending on the optical path and the spacing between the light-emitting units in the laser diode array, and the disclosure is not limited thereto. The disclosure does not limit the number and symmetry of the third transmissive regions 172. In this way, the number of the third transmissive regions 172 may be omitted according to the optical path, thus reducing the production cost of the third light comber 170A.

Continuing to refer to FIG. 2, in this embodiment, the illumination system 50 further includes an optical lens element 190. The optical lens element 190 is, for example, a focusing lens disposed on transmission paths of the first light L1 to the fourth light L4. A reference plane P may be defined as a plane on a light-emitting side of the optical lens element 190 and perpendicular to the second direction D2. The third light combiner 170 is located between the fourth laser diode array 140 and the optical lens element 190. The optical lens element 190 has a central axis OA, and the first light L1 to the fourth light L4 from the third light combiner 170 are transmitted to the optical lens element 190 in a manner deviating from the central axis OA. By the above configuration of the first laser diode array 110, the second laser diode array 120, the third laser diode array 130, the fourth laser diode array 140, the first light combiner 150, the second light combiner 160, and the third light combiner 170, the first light L1 provided by the first laser diode array 110 is reflected by the reflective element 180 and then sequentially passes through the first transmissive regions 152 of the first light combiner 150 and the second transmissive regions 162 of the second light combiner 160, and is reflected by the third reflective region 174 of the third light combiner 170. The first light L1 reflected by the third light combiner 170 is transmitted to the reference plane P perpendicular to the second direction D2 and a plurality of light spots corresponding to the plurality of laser beams of the first light L1 are formed on the reference plane P. The second light L2 provided by the second laser diode array 120 is reflected by the first reflective regions 154 of the first light combiner 150, passes through the second transmissive regions 162 of the second light combiner 160, and then is reflected by the third reflective region 174 of the third light combiner 170. The second light L2 reflected by the third light combiner 170 is transmitted to the reference plane P and a plurality of light spot corresponding to the plurality of laser beams of the second light L2 are formed on the reference plane P. The third light L3 provided by the third laser diode array 130 is sequentially reflected by the second reflective regions 164 of the second light combiner 160 and the third reflective region 174 of the third light combiner 170. The third light L3 reflected by the third light combiner 170 is transmitted to the reference plane P and a plurality of light spots corresponding to the plurality of laser beams of the third light L3 are formed on the reference plane P. The fourth light L4 provided by the fourth laser diode array 140 passes through the third transmissive regions 172 of the third light combiner 170 and is transmitted to the reference plane P, and a plurality of light spots corresponding to the plurality of laser beams of the fourth light L4 are formed on the reference plane P. In this way, the light spots on the reference plane P formed by the first light L1 to the fourth light L4 may be evenly distributed, so that the configuration of the laser diode arrays which are configured to form the combined light spots may be equivalent to a surface light source. Therefore, the light intensity distribution of the first light L1 to the fourth light L4 incident on the wavelength conversion element is uniform. In addition, most of the laser diode arrays are arranged in a continuous configuration, so the laser diode arrays are able to connect with the same heat sink. Furthermore, in this embodiment, the light spots corresponding to the plurality of laser beams of each of the first light L1 to the fourth light L4 transmitted to the optical lens element 190 from the third light combiner 170 on the reference plane P perpendicular to the second direction D2 have a same long axis direction. Thus, when the first light L1 to the fourth light L4 are transmitted from the optical lens element 190 to the downstream optical elements (such as other optical lens elements, optical elements, or light integration rod), the light spots can be consistent, thus improving adjustability.

In other embodiments, the first light combiner 150 may have the first transmissive regions 152 and the first reflective regions 154 arranged in a checkerboard configuration, and the second light combiner 160 may have the second transmissive regions 162 and the second reflective regions 164 arranged in a checkerboard configuration. In other words, both the first light combiner 150 and the second light combiner 160 are designed as beam splitters, just like the third light combiner 170 having the third transmissive regions 172 and the reflective region 174 formed in a checkerboard configuration, but the disclosure is not limited thereto.

Figures 7A, 7B:
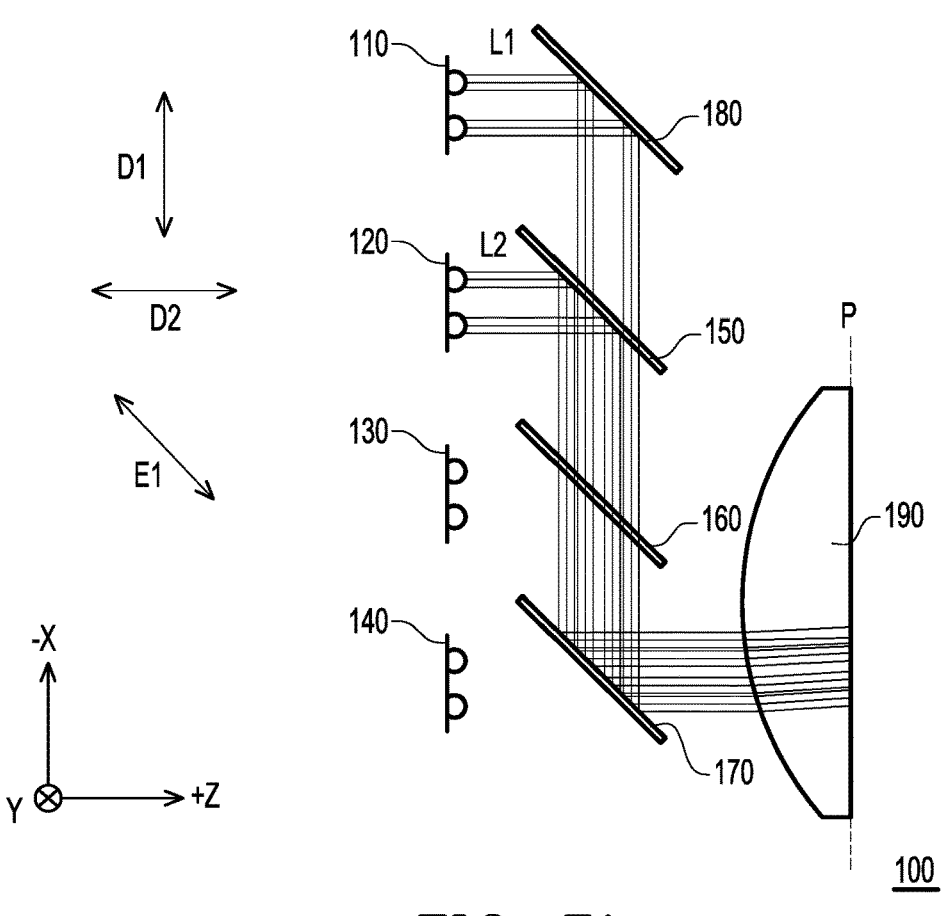
FIG. 7A and FIG. 7B are a schematic diagram of optical paths of a first light and a second light in a light source module according to an embodiment of the disclosure and a schematic diagram of light spots in a reference plane, respectively.

FIG. 7A and FIG. 7B are a schematic diagram of optical paths of a first light and a second light in a light source module according to an embodiment of the disclosure and a schematic diagram of light spots in a reference plane, respectively. Referring to FIG. 4A, FIG. 5, FIG. 6A, FIG. 7A, and FIG. 7B, to further illustrate, an optical path of the first light L1 and an optical path of the second light L2 show in FIG. 7A, and the plurality of light spots Q1 corresponding the plurality of laser beams of the first light L1 formed on the reference plane P and the plurality of light spots Q2 corresponding the plurality of laser beams of the second light L2 formed on the reference plane P show in FIG. 7B. The first light L1 passes through the first transmissive regions 152 of the first light combiner 150, and the second light L2 is reflected by the first reflective regions 154 of the first light combiner 150. Since the first transmissive regions 152 and the first reflective regions 154 are arranged in the alternate order along the first arrangement direction E1, the light spots Q1 formed by the first light L1 and the light spots Q2 formed by the second light L2 on the reference plane P are arranged in an alternate order along the first direction D1.

Figure 8A:
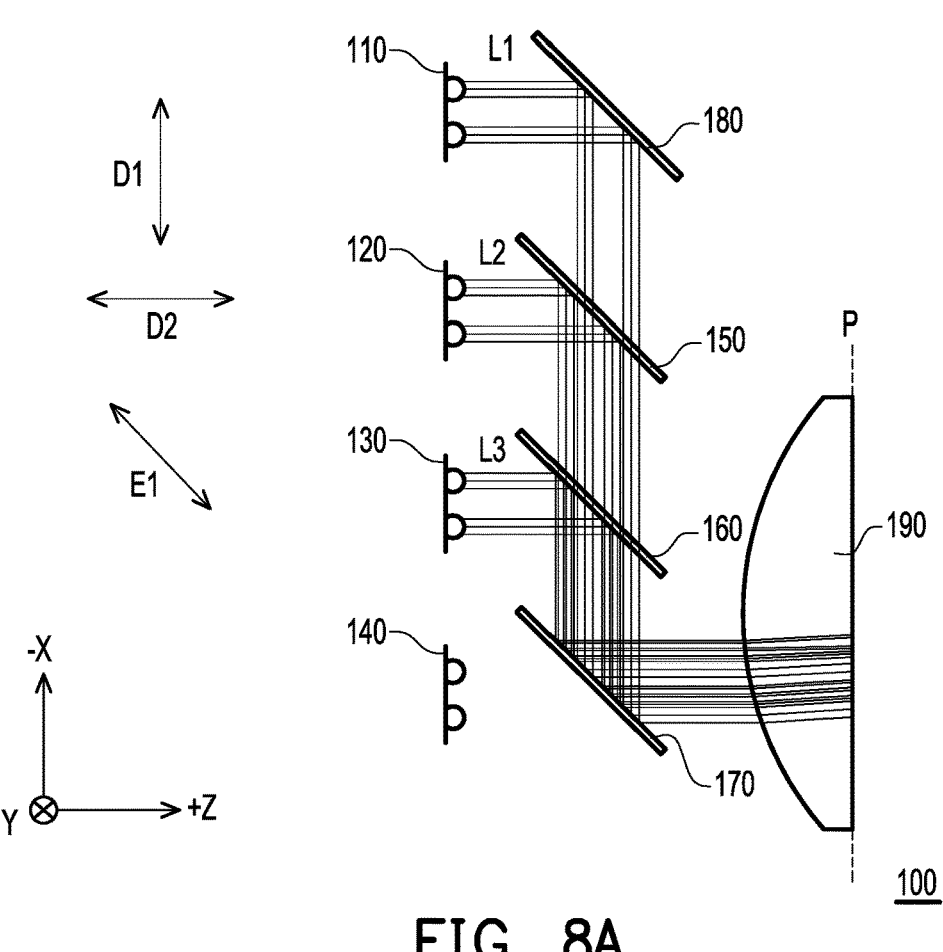
FIG. 8A and FIG. 8B are a schematic diagram of optical paths of a first light to a third light in a light source module according to an embodiment of the disclosure and a schematic diagram of light spots in a reference plane, respectively.
Figure 8B:
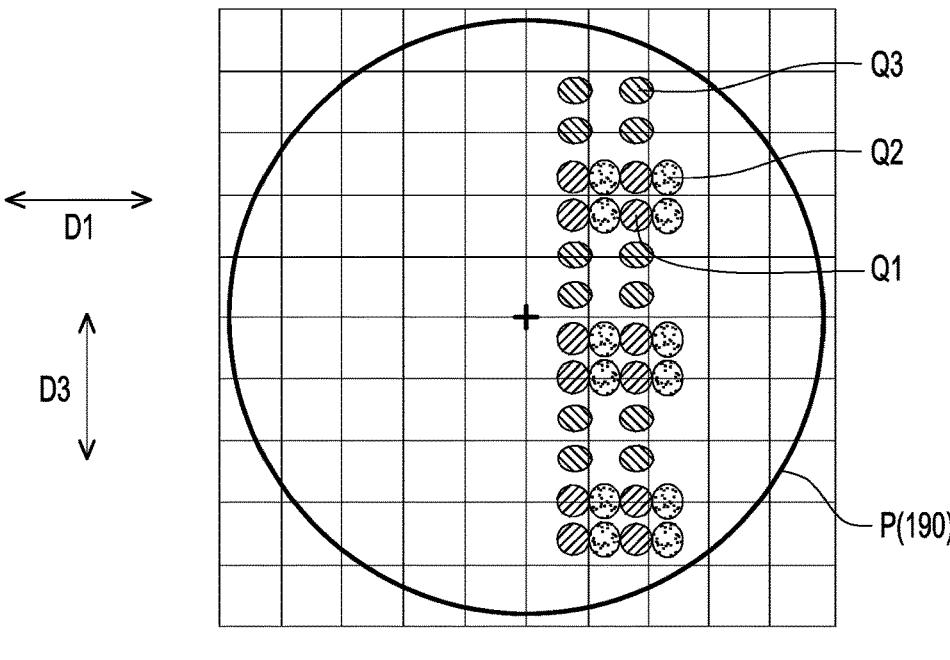

FIG. 8A and FIG. 8B are a schematic diagram of optical paths of a first light to a third light in a light source module according to an embodiment of the disclosure and a schematic diagram of light spots in a reference plane, respectively. Referring to FIG. 4A, FIG. 5, FIG. 6A, FIG. 8A, and FIG. 8B, furthermore, optical paths of the first light L1, the second light L2, and the third light L3 show in FIG. 8A, and the plurality of light spots Q1 corresponding the plurality of laser beams of the first light L1, the plurality of light spots Q2 corresponding the plurality of laser beams of the second light L2, and the plurality of light spots Q3 corresponding the plurality of laser beams of the third light L3 formed on the reference plane P show in FIG. 8B. The first light L1 and the second light L2 pass through the second transmissive regions 162 of the second light combiner 160, and the third light L3 is reflected by the second reflective regions 164 of the second light combiner 160. Since the second transmissive regions 162 and the second reflective regions 164 are arranged in the alternate order along the second arrangement direction E2, the light spots Q3 formed by the third light L3 on the reference plane P are alternate with the light spots Q1 and Q2 formed by the first light L1 and the second light L2 on the reference plane P in a direction perpendicular to the first direction D1 and the second direction D2 (i.e., the third direction D3).

Figure 9A:
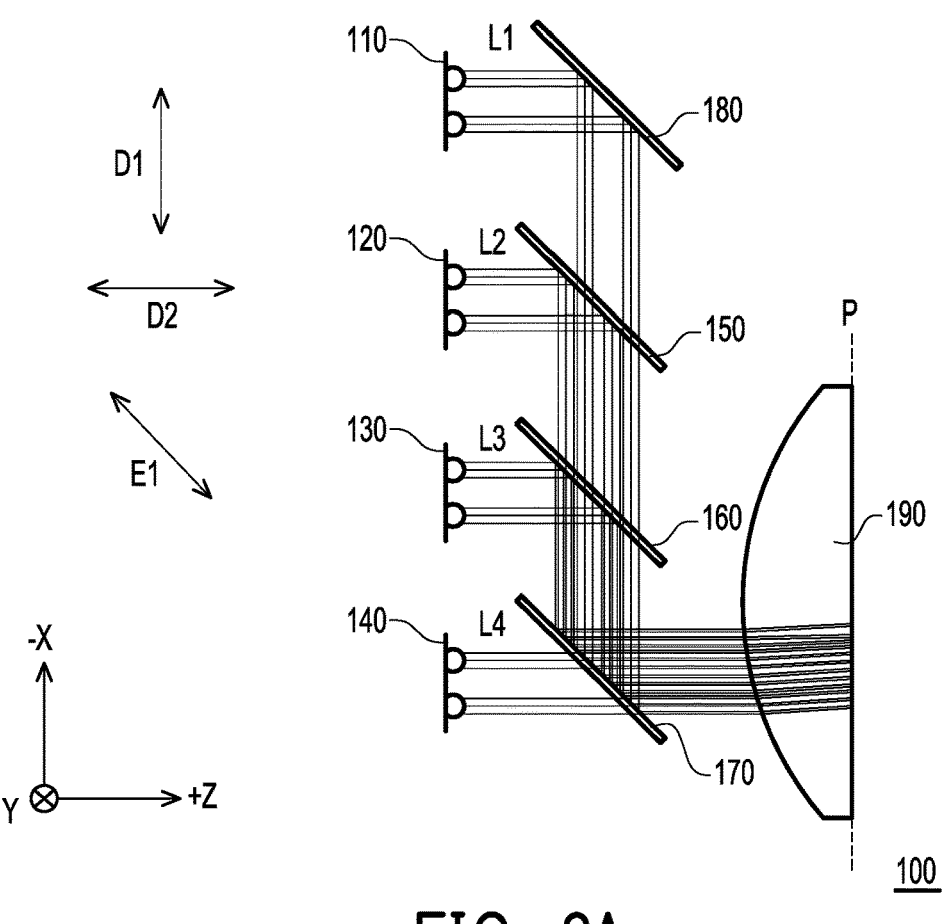
FIG. 9A and FIG. 9B are a schematic diagram of optical paths of a first light to a fourth light in a light source module according to an embodiment of the disclosure and a schematic diagram of light spots in a reference plane, respectively.
Figure 9B:
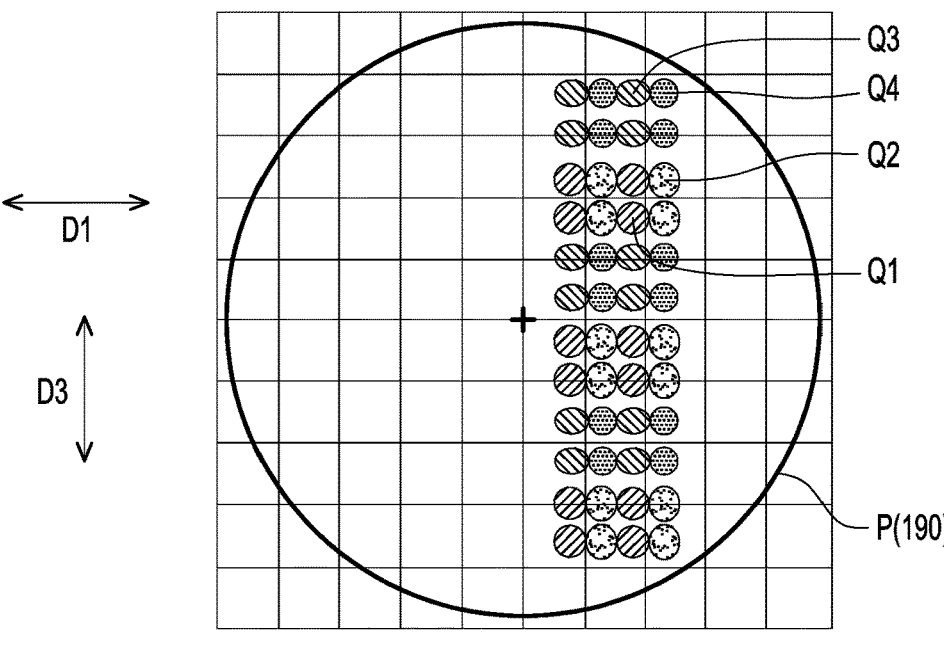

FIG. 9A and FIG. 9B are a schematic diagram of optical paths of a first light to a fourth light in a light source module according to an embodiment of the disclosure and a schematic diagram of light spots in a reference plane, respectively. Referring to FIG. 9A and FIG. 9B, furthermore, optical paths of the first light L1, the second light L2, the third light L3, and the fourth light L4 show in FIG. 9A. The plurality of light spots Q1 corresponding the plurality of laser beams of the first light L1, the plurality of light spots Q2 corresponding the plurality of laser beams of the second light L2, the plurality of light spots Q3 corresponding the plurality of laser beams of the third light L3, and the plurality of light spots Q4 corresponding the plurality of laser beams of the fourth light L4 formed on the reference plane P show in FIG. 9B. The first light L1 to the third light L3 are reflected by the third reflective region 174 of the third light combiner 170, and the fourth light L4 passes through the third transmissive regions 172 of the third light combiner 170. Since the third transmissive regions are arranged in an array in a plane formed by the first arrangement direction E1 and by the second arrangement direction E2 and are spaced apart from each other, and the third reflective region 174 are disposed on the plane between the third transmissive regions 172, the light spots Q4 formed by the fourth light L4 on the reference plane P are alternate with the light spots Q1 and Q2 formed by the first light L1 and the second light L2 on the reference plane P in a direction perpendicular to the first direction D1 and the second direction D2 (i.e., the third direction D3). In addition, the light spots Q3 formed by the third light L3 and the light spots Q4 formed by the fourth light L4 on the reference plane P are arranged in an alternate order along the first direction D1. In this way, the light spots Q1, Q2, Q3, and Q4 on the reference plane P formed by the first light L1 to the fourth light L4 may be evenly distributed, so that the configuration of the laser diode arrays which are configured to form the combined light spots may be equivalent to a surface light source. Therefore, the light intensity distribution of the first light L1 to the fourth light L4 incident on the wavelength conversion element is uniform.

Figure 10:
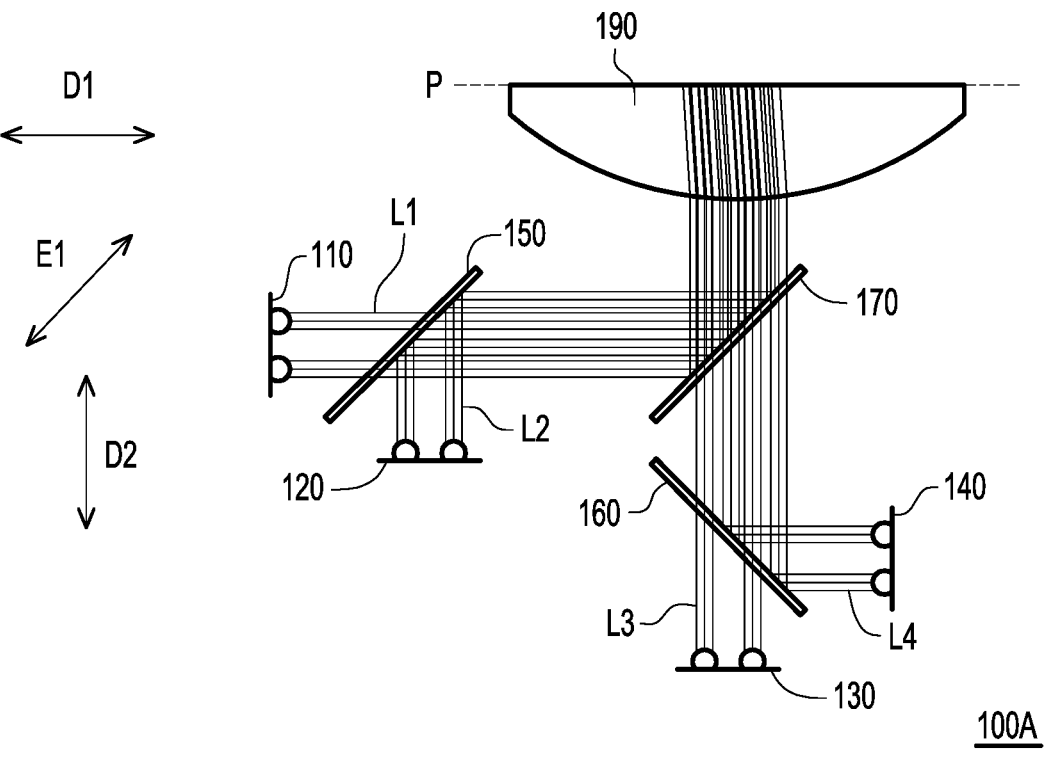
FIG. 10 is a schematic diagram of a light source module according to another embodiment of the disclosure.

FIG. 10 is a schematic diagram of a light source module according to another embodiment of the disclosure. A light source module 100A shown in FIG. 10 may be applied at least in the illumination system 50 of the projection apparatus 10 shown in FIG. 1, and the first laser diode array 110 to the fourth laser diode array 140 shown in FIG. 3A, FIG. 3B and FIG. 11 may be applied to at least the light source module 100A shown in FIG. 10, which is thus illustrated below as an example. Referring to FIG. 10, the light source module 100A includes the first laser diode array 110, the second laser diode array 120, the third laser diode array 130, the fourth laser diode array 140, a first light combiner 150, a second light combiner 160, and a third light combiner 170. The second laser diode array 120 and the third laser diode array 130 are arranged parallel to the first direction D1, the first laser diode array 110 and the fourth laser diode array 140 are arranged parallel to the second direction D2. In this embodiment of FIG. 10 and FIG. 11, each of the light-emitting units includes, for example, two multiple laser diode chip packages. The two multiple laser diode chip packages of each light-emitting unit of the first laser diode array 110 are arranged in the second direction D2, and the first laser diode array 110 provides the first light L1 in the first direction D1. The two multiple laser diode chip packages of each light-emitting unit of the second laser diode array 120 are arranged in the first direction D1, and the second laser diode array 120 provides the second light L2 in the second direction D2. The two multiple laser diode chip packages of each light-emitting unit of the third laser diode array 130 are arranged in the first direction D1, and the third laser diode array 130 provides the third light L3 in the second direction D2. The two multiple laser diode chip packages of each light-emitting unit of the fourth laser diode array 140 are arranged in the second direction D2, and the fourth laser diode array 140 provides the fourth light L4 in the first direction D1. The first light combiner 150 is disposed on the transmission paths of the first light L1 and the second light L2, the second light combiner 160 is disposed on the transmission paths of the third light L3 and the fourth light L4, and the third light combiner 170 is disposed on the transmission paths of the first light L1, the second light L2, the third light L3, and the fourth light L4. If defined in a Cartesian coordinate system, in this embodiment, the first direction D1 may be defined as a direction parallel to the X-axis. The first transmissive regions 152 of the first light combiner 150 are configured to allow the first light L1 from the first laser diode array 110 to pass through, and the first reflective regions 154 are configured to reflect the second light L2 from the second laser diode array 120 to the third light combiner 170. The second transmissive regions 162 of the second light combiner 160 are configured to allow the third light L3 from the third laser diode array 130 to pass through to the third light combiner 170, and the second reflective regions 164 are configured to reflect the fourth light L4 from the fourth laser diode array 140 to third light combiner 170. The third transmissive regions 172 of the third light combiner 170 are configured to allow the third light L3 and the fourth light L4 from the second light combiner 160 to pass through, such that the third light L3 and the fourth light L4 are transmitted in the second direction D2. The third reflective region 174 is configured to reflect the first light L1 and the second light L2 from the first light combiner 150, such that the first light L1 and the second light L2 are transmitted in the second direction D2, and the first direction D1 is perpendicular to the second direction D2. In this embodiment, the first light L1 and the second light L2 may be sequentially transmitted to the first light combiner 150 and the third light combiner 170, and the third light L3 and the fourth light L4 may be sequentially transmitted to the second light combiner 160 and the third light combiner 170. The first light L1, the second light L2, the third light L3, and the fourth light L4 are transmitted to the reference plane P by the third light combiner 170 to form evenly distributed light spots.

Figure 12:
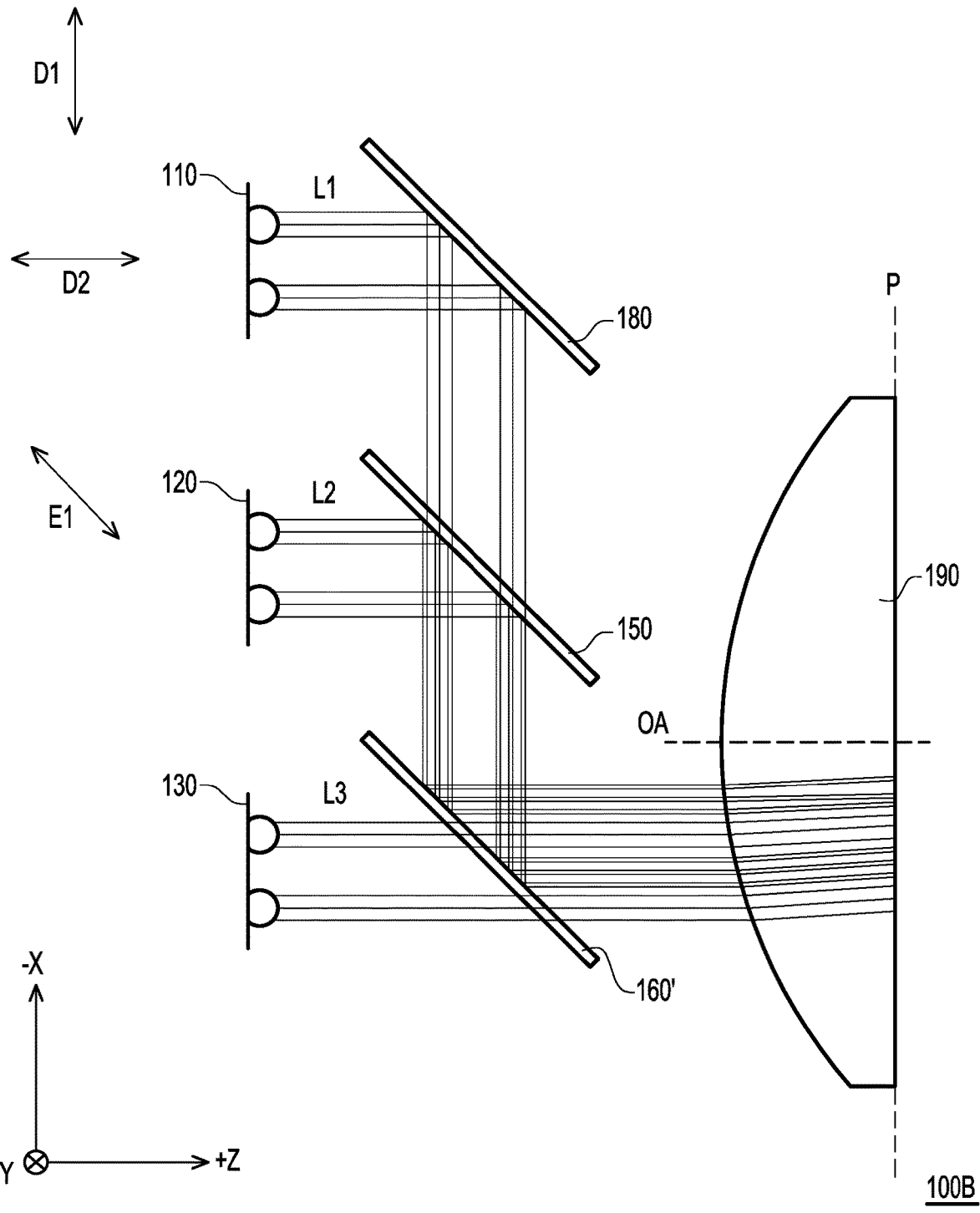
FIG. 12 is a schematic diagram of a light source module according to another embodiment of the disclosure.

FIG. 12 is a schematic diagram of a light source module according to another embodiment of the disclosure. A light source module 100B shown in FIG. 12 may be applied at least in the illumination system 50 of the projection apparatus 10 shown in FIG. 1, which is thus illustrated below as an example. Referring to FIG. 12, the light source module 100B includes a first laser diode array 110, a second laser diode array 120, a third laser diode array 130, a first light combiner 150, and a second light combiner 160'. The first laser diode array 110, the second laser diode array 120, and the third laser diode array 130 are arranged in the first direction D1. The first laser diode array 110 provides a first light L1, the second laser diode array 120 provides a second light L2, and the third laser diode array 130 provides a third light L3. The first light combiner 150 is on the transmission paths of the first light L1 and the second light L2, the second light combiner 160' is on the transmission paths of the first light L1, the second light L2, and the third light L3. If defined in a Cartesian coordinate system, in this embodiment, the first direction D1 can be defined as a direction parallel to the X-axis. The light source module 100B further includes a reflective element 180, for example a reflector, disposed on the transmission path of the first light L1 from the first laser diode array 110 for reflecting the first light L1 to the first light combiner 150. The first laser diode array 110 provides the first light L1 in the second direction D2. However, in other embodiments, it is possible to design the first laser diode array 110 to provide the first light L1 directly to the first light combiner 150 in the first direction D1 in order to omit the configuration of the reflective element 180, and the disclosure is not limited thereto.

The difference between the embodiment of FIG. 12 and the embodiment of FIG. 2 is the number of the laser diode arrays. Three laser diode arrays are only used in the light source module 100B in FIG. 12. And the second light combiner 160' of FIG. 12 is used to guide the third light L3 from the third laser diode array 130, the first light L1 and the second light L2 from the first light combiner 150 to the optical lens element 190. The second light combiner 160' is located between the third laser diode array 130 and the optical lens element 190. The first light L1 to the third light L3 from the second light combiner 160' are transmitted to the optical lens element 190 in a manner deviating from the central axis OA of the optical lens element 190.

Figure 13A:
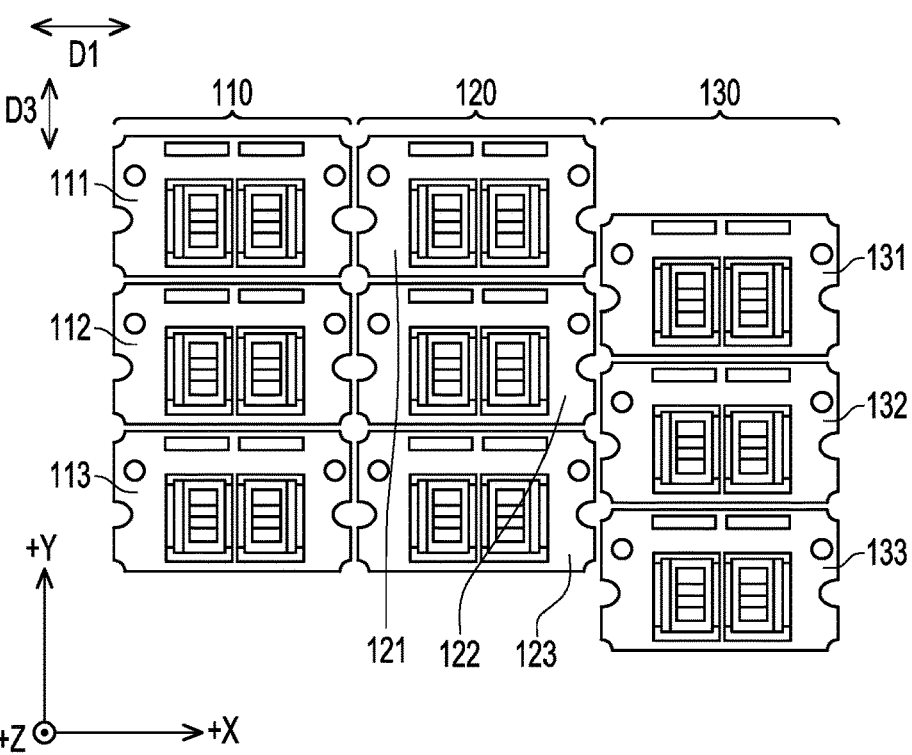
FIG. 13A and FIG. 13B are schematic diagrams of a first laser diode array to a third laser diode array according to the embodiment of FIG. 12 of the disclosure.
Figure 13B:
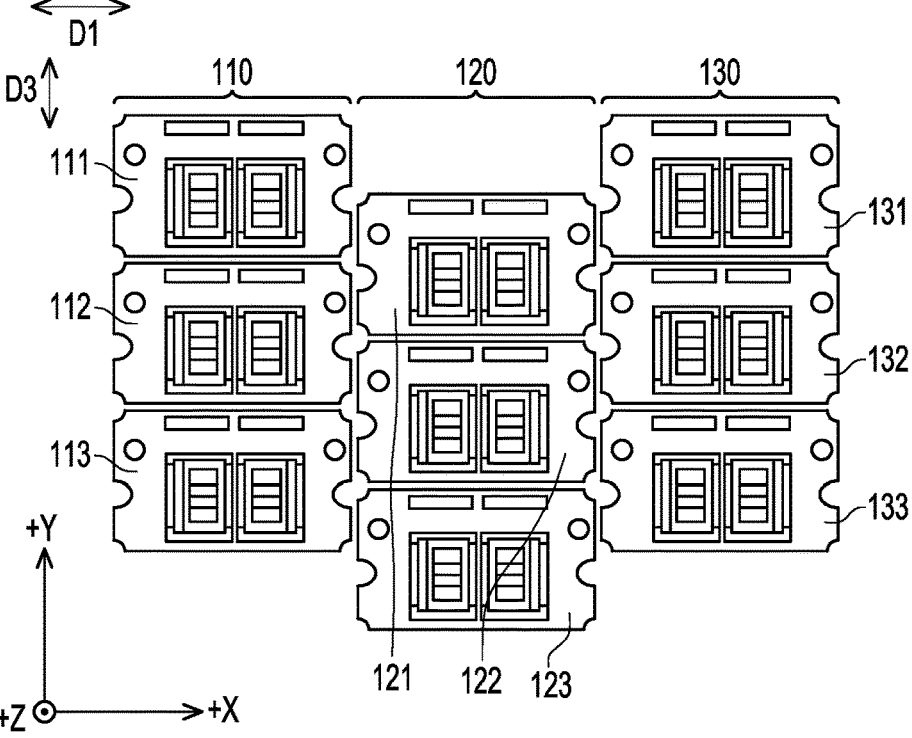

FIG. 13A and FIG. 13B are schematic diagrams of a first laser diode array to a third laser diode array according to the embodiment of FIG. 12 of the disclosure. The first laser diode array 110 to the third laser diode array 130 shown in FIG. 13A and FIG. 13B may be applied to at least the light source module 100B shown in FIG. 12, which is thus illustrated below as an example. Each of the laser diode arrays 110, 120, 130 have the same or similar arrangement as described above reference to FIG. 3A and FIG. 3B. In the embodiment of FIG. 13A, the first laser diode array 110 and the second laser diode array 120 in the direction perpendicular to the first direction D1 are staggered with the third laser diode array 130. For example, in this embodiment, the first laser diode array 110 and the second laser diode array 120 are arranged in parallel and are not misaligned in the third direction D3. In the embodiment of FIG. 13B, the first laser diode array 110 and the third laser diode array 130 are arranged in parallel and are not misaligned in the third direction D3, and the first laser diode array 110 and the second laser diode array 120 are staggered with each other in the third direction D3.

Figure 14:
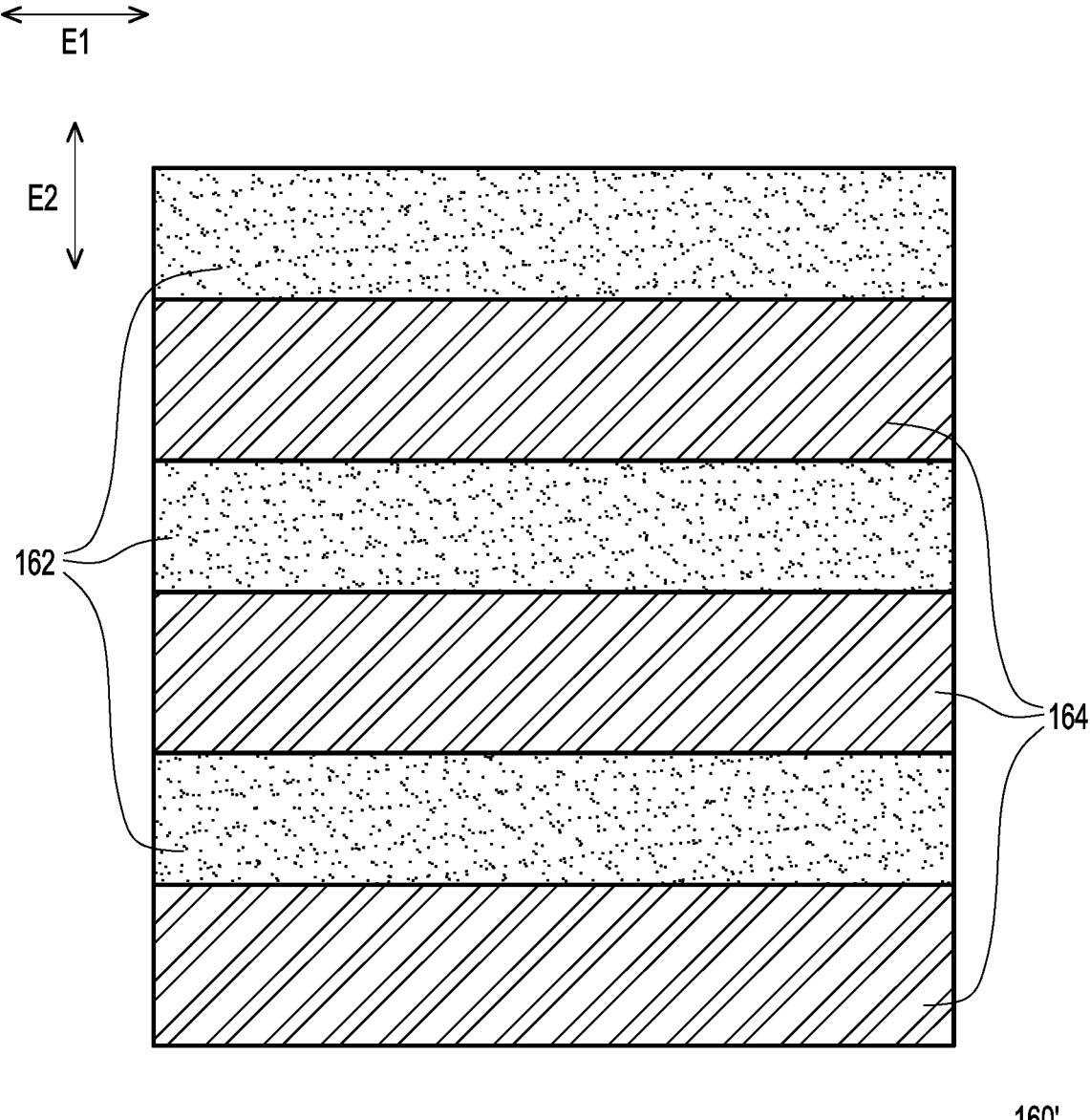
FIG. 14 a schematic diagram of a second light combiner according to the embodiment of FIG. 12 of the disclosure.

FIG. 14 a schematic diagram of a second light combiner according to the embodiment of FIG. 12 of the disclosure. The second light combiner 160' shown in FIG. 14 may be applied to at least the light source module 100B shown in FIG. 12, which is thus illustrated below as an example. Referring to FIG. 12 and FIG. 14, the second light combiner 160' includes a plurality of second transmissive regions 162 and a plurality of second reflective regions 164 arranged in an alternate order along the second arrangement direction E2, and each of the second reflective regions 164 and each of the second transmissive regions 162 of the light combiner 160 extend in the first arrangement direction E1. The second transmissive regions 162 are configured to allow the third light L3 from the third laser diode array 130 to pass through. The second reflective regions 164 are configured to reflect the first light L1 and the second light L2 from the first light combiner 150. Furthermore, the plurality of laser beams of the first light L1 and the plurality of laser beams of the second light L2 are configured to be reflected by the second reflective regions 164, and the plurality of laser beams of the third light L3 are configured to pass through the second transmissive regions 162. Therefore, the first light L1 to the third light L3 from the second light combiner 160' are transmitted to the optical lens element 190 in the second direction D2. Moreover, the first light to the third light from the second light combiner are transmitted to the optical lens element 190 in a manner deviating from a central axis OA of the optical lens 190. The plurality of the light spots corresponding the first light L1, the plurality of the light spots corresponding the second light L2, and the plurality of the light spots corresponding the third light L3 may be evenly formed on the reference plane P.

To sum up, the embodiments of the disclosure have at least one of the following advantages or functions. In the light source module and the projection apparatus of the disclosure, the first light combiner includes a plurality of first transmissive regions and a plurality of first reflective regions arranged in an alternate order along the first arrangement direction. The second light combiner includes a plurality of second transmissive regions and a plurality of second reflective regions arranged in an alternate order along the second arrangement direction. The third light combiner includes a plurality of third transmissive regions and a third reflective region distributed between the third transmissive regions. The third transmissive regions and a plane formed in the first arrangement direction and in the second arrangement direction are arranged in an diode array. Therefore, the first light and the second light may be sequentially transmitted to the first light combiner, the second light combiner, and the third light combiner, the third light is sequentially transmitted to the second light combiner and the third light combiner, the fourth light is transmitted to the third light combiner, and the first light, the second light, the third light, and the fourth light are transmitted to the reference plane by the third light combiner to form evenly distributed light spots. Alternatively, in another embodiment, the first light and the second light may be sequentially transmitted to the first light combiner and the third light combiner, the third light and the fourth light are sequentially transmitted to the second light combiner and the third light combiner, and the first light, the second light, the third light, and the fourth light are transmitted to the reference plane by the third light combiner to form evenly distributed light spots. Alternatively, in another embodiment, the first light and the second light may be sequentially transmitted to the first light combiner and the second light combiner, the third light is transmitted to the second light combiner, and the first light to the third light are transmitted to the reference plane by the second light combiner to form evenly distributed light spots. In this way, the light spots formed by the first light to the fourth light on the reference plane may be evenly distributed, so that the configuration of the laser diode arrays which are configured to form the combined light spots may be equivalent to a surface light source. Therefore, the light intensity distribution of the first light to the fourth light incident on the wavelength conversion element is uniform.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the invention for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Or, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as d defined by the following claims. Furthermore, no element and component in the present disclosure is intended to be dedicated to the public regardless of whether the element or component is explicitly recited in the following claims.

What is claimed is:

1. A light source module comprising a first laser diode array, a second laser diode array, a third laser diode array, a fourth laser diode array, a first light combiner, a second light combiner, and a third light combiner, wherein:

the first laser diode array, the second laser diode array, the third laser diode array, and the fourth laser diode array are arranged in a first direction;

the first laser diode array provides a first light;

the second laser diode array provides a second light;

the third laser diode array provides a third light;

the fourth laser diode array provides a fourth light;

the first light combiner comprises a plurality of first transmissive regions and a plurality of first reflective regions arranged in an alternate order along a first arrangement direction, the first transmissive regions are configured to allow the first light from the first laser diode array to pass through, and the first reflective regions are configured to reflect the second light from the second laser diode array to the second light combiner;

the second light combiner comprises a plurality of second transmissive regions and a plurality of second reflective regions arranged in the alternate order along a second arrangement direction, the second transmissive regions are configured to allow the first light and the second light from the first light combiner to pass through, and the second reflective regions are configured to reflect the third light from the third laser diode array to the third light combiner; and the third light combiner comprises a plurality of third transmissive regions and a third reflective region distributed between the third transmissive regions, the third transmissive regions are arranged in an array in a plane formed by the first arrangement direction and the second arrangement direction, the third transmissive regions are configured to allow the fourth light from the fourth laser diode array to pass through and be transmitted in a second direction, the third reflective region is configured to reflect the first light to the third light from the second light combiner to be transmitted in the second direction, the first direction is perpendicular to the second direction, and the first arrangement direction is perpendicular to the second arrangement direction.

2. The light source module according to claim 1, wherein a plurality of light spots corresponding to the first light and a plurality of light spots corresponding to the second light from the third light combiner in a reference plane perpendicular to the second direction are arranged in an alternate order along the first direction, a plurality of light spots corresponding to the third light and a plurality of light spots corresponding to the fourth light from the third light combiner in the reference plane are arranged in an alternative order along the first direction, wherein the plurality of light spots corresponding to the first light and the plurality of light spots corresponding to the second light from the third light combiner in the reference plane are alternate with the plurality of light spots corresponding to the third light and the plurality of light spots corresponding to the fourth light in the reference plane along a direction perpendicular to the first direction and the second direction.

3. The light source module according to claim 1, wherein a plurality of light spots corresponding to the first light, a plurality of light spots corresponding to the second light, a plurality of light spots corresponding to the third light, and a plurality of light spots corresponding to the fourth light from the third light combiner in a reference plane perpendicular to the second direction have a same long axis direction.

4. The light source module according to claim 1 further comprising a reflective element, the reflective element disposed on a transmission path of the first light and configured to reflect the first light to the first light combiner, wherein the first laser diode array provides the first light in the second direction, the second laser diode array provides the second light in the second direction, the third laser diode array provides the third light in the second direction, and the fourth laser diode array provides the fourth light in the second direction.

5. The light source module according to claim 1, wherein two of the first laser diode array, the second laser diode array, the third laser diode array, and the fourth laser diode array in a direction perpendicular to the first direction are staggered with the other two of the first laser diode array, the second laser diode array, the third laser diode array, and the fourth laser diode array.

6. The light source module according to claim 1, wherein the first arrangement direction is arranged at 45 degrees to the first direction, the second arrangement direction is perpendicular to the first direction and the second direction, or the first arrangement direction is perpendicular to the first direction and the second direction, and the second arrangement direction is arranged at 45 degrees to the first direction.

7. The light source module according to claim 1, wherein each of the first laser diode array to the fourth laser diode array comprises a plurality of light-emitting units arranged and spaced apart in a direction perpendicular to the first direction, each of the light-emitting units is an multiple laser diode chip package or two multiple laser diode chip packages, wherein the first light to the fourth light have the same wavelength.

8. The light source module according to claim 1, wherein each of the first reflective regions and each of the first transmissive regions of the first light combiner extend in the second arrangement direction, each of the second reflective regions and each of the second transmissive regions of the second light combiner extend in the first arrangement direction, and the first reflective regions in the first arrangement direction have the same width or different width.

9. The light source module according to claim 1, wherein the first transmissive regions and the first reflective regions of the first light combiner are arranged in the alternate order along the second arrangement direction, and the second transmissive regions and the second reflective regions of the second light combiner are arranged in the alternate order along the first arrangement direction.

10. A light source module comprising a first laser diode array, a second laser diode array, a third laser diode array, a fourth laser diode array, a first light combiner, a second light combiner, and a third light combiner, wherein:

the first laser diode array and the fourth laser diode array are arranged parallel to a second direction, and the second laser diode array and the third laser diode array are arranged parallel to a first direction;

the first laser diode array provides a first light;

the second laser diode array provides a second light;

the third laser diode array provides a third light;

the fourth laser diode array provides a fourth light;

the first light combiner comprises a plurality of first transmissive regions and a plurality of first reflective regions arranged in an alternate order along a first arrangement direction, the first transmissive regions are configured to allow the first light from the first laser diode array to pass through, and the first reflective regions are configured to reflect the second light from the second laser diode array to the third light combiner;

the second light combiner comprises a plurality of second transmissive regions and a plurality of second reflective regions arranged in the alternate order along a second arrangement direction, the second transmissive regions are configured to allow the third light from the third laser diode array to pass through to the third light combiner, and the second reflective regions are configured to reflect the fourth light from the fourth laser diode array to the third light combiner; and the third light combiner comprises a plurality of third transmissive regions and a third reflective region distributed between the third transmissive regions, the third transmissive regions are arranged in an array in a plane formed by the first arrangement direction and the second arrangement direction, the third transmissive regions are configured to allow the third light and the fourth light from the second light combiner to pass through and be transmitted in the second direction, the third reflective region is configured to reflect the first light and the second light from the first light combiner to be transmitted in the second direction, the first direction is perpendicular to the second direction, and the first arrangement direction is perpendicular to the second arrangement direction.

11. A projection apparatus comprising an illumination system, at least one light valve, and a projection lens, wherein:

the illumination system is for providing an illumination light, the illumination system comprises a light source module, and the light source module comprises a first laser diode array, a second laser diode array, a third laser diode array, a fourth laser diode array, a first light combiner, a second light combiner, and a third light combiner, wherein:

the first laser diode array, the second laser diode array, the third laser diode array, and the fourth laser diode array are arranged in a first direction;

the first laser diode array provides a first light;

the second laser diode array provides a second light;

the third laser diode array provides a third light;

the fourth laser diode array provides a fourth light;

the first light combiner comprises a plurality of first transmissive regions and a plurality of first reflective regions arranged in an alternate order along a first arrangement direction, the first transmissive regions are configured to allow the first light from the first laser diode array to pass through, and the first reflective regions are configured to reflect the second light from the second laser diode array to the second light combiner;

the second light combiner comprises a plurality of second transmissive regions and a plurality of second reflective regions arranged in the alternate order along a second arrangement direction, the second transmissive regions are configured to allow the first light and the second light from the first light combiner to pass through, and the second reflective regions are configured to reflect the third light from the third laser diode array to the third light combiner; and the third light combiner comprises a plurality of third transmissive regions and a third reflective region distributed between the third transmissive regions, the third transmissive regions are arranged in an array in a plane formed by the first arrangement direction and the second arrangement direction, the third transmissive regions are configured to allow the fourth light from the fourth laser diode array to pass through and be transmitted in a second direction, the third reflective region is configured to reflect the first light to the third light from the second light combiner to be transmitted in the second direction, the first direction is perpendicular to the second direction, and the first arrangement direction is perpendicular to the second arrangement direction, wherein the illumination light comprises at least one of the first light to the fourth light from the third light combiner;

the at least one light valve is disposed on a transmission path of the illumination light for converting the illumination light into an image light; and the projection lens is disposed on a transmission path of the image light for projecting the image light out of the projection apparatus.

12. The projection apparatus according to claim 11, wherein a plurality of light spots corresponding to the first light and a plurality of light spots corresponding to the second light from the third light combiner in a reference plane perpendicular to the second direction are arranged in an alternate order along the first direction, a plurality of light spots corresponding to the third light and a plurality of light spots corresponding to the fourth light from the third light combiner in the reference plane are arranged in an alternate order along the first direction, wherein the plurality of light spots corresponding to the first light and the plurality of light spots corresponding to the second light from the third light combiner in the reference plane are alternate with the plurality of light spots corresponding to the third light and the plurality of light spots corresponding to the fourth light in the reference plane along a direction perpendicular to the first direction and the second direction.

13. The projection apparatus according to claim 11, wherein a plurality of light spots corresponding to the first light, a plurality of light spots corresponding to the second light, a plurality of light spots corresponding to the third light, and a plurality of light spots corresponding to the fourth light from the third light combiner in a reference plane perpendicular to the second direction have the same long axis direction.

14. The projection apparatus according to claim 11, wherein the light source module further comprises a reflective element, the reflective element is disposed on a transmission path of the first light and is configured to reflect the first light to the first light combiner, the first laser diode array provides the first light in the second direction, the second laser diode array provides the second light in the second direction, the third laser diode array provides the third light in the second direction, and the fourth laser diode array provides the fourth light in the second direction.

15. The projection apparatus according to claim 11, wherein two of the first laser diode array, the second laser diode array, the third laser diode array and the fourth laser diode array in a direction perpendicular to the first direction are staggered with the other two of the first laser diode array, the second laser diode array, the third laser diode array and the fourth laser diode array.

16. The projection apparatus according to claim 11, wherein the first arrangement direction is arranged at 45 degrees to the first direction, the second arrangement direction is perpendicular to the first direction and the second direction, or the first arrangement direction is perpendicular to the first direction and the second direction, and the second arrangement direction is arranged at 45 degrees to the first direction.

17. The projection apparatus according to claim 11, wherein each of the first laser diode array to the fourth laser diode array comprises a plurality of light-emitting units arranged and spaced apart in a direction perpendicular to the first direction, each of the light-emitting units is an multiple laser diode chip package or two multiple laser diode chip packages, wherein the first light to the fourth light have the same wavelength.

18. The projection apparatus according to claim 11, wherein each of the first reflective regions and each of the first transmissive regions of the first light combiner extend in the second arrangement direction, each of the second reflective regions and each of the second transmissive regions of the second light combiner extend in the first arrangement direction, and the first reflective regions in the first arrangement direction have the same width or different width.

19. The projection apparatus according to claim 11, wherein the first transmissive regions and the first reflective regions of the first light combiner are arranged in the alternate order along the second arrangement direction, and the second transmissive regions and the second reflective regions of the second light combiner are arranged in the alternate order along the first arrangement direction.

20. The projection apparatus according to claim 11, wherein the illumination system further comprises at least one optical lens element, the at least one optical lens element has a central axis, and the first light to the fourth light from the third light combiner are transmitted to the at least one optical lens element in a manner deviating from the central axis.

21. A light source module comprising a first laser diode array, a second laser diode array, a third laser diode array, a first light combiner, and a second light combiner, wherein:

the first laser diode array, the second laser diode array, and the third laser diode array are arranged in a first direction;

the first laser diode array provides a first light;

the second laser diode array provides a second light;

the third laser diode array provides a third light;

the first light combiner comprises a plurality of first transmissive regions and a plurality of first reflective regions arranged in an alternate order along a first arrangement direction, the first transmissive regions are configured to allow the first light from the first laser diode array to pass through, and the first reflective regions are configured to reflect the second light from the second laser diode array to the second light combiner; and the second light combiner comprises a plurality of second transmissive regions and a plurality of second reflective regions arranged in an alternate order along a second arrangement direction, the second transmissive regions are configured to allow the third light from the third laser diode array to pass through, and the second reflective regions are configured to reflect the first light and the second light from the first light combiner, and the first light, the second light and the third light are guided by the second light combiner to be transmitted in a second direction, wherein the first direction is perpendicular to the second direction, and the first arrangement direction is perpendicular to the second arrangement direction.

22. The light source module according to claim 21, wherein each of the first laser diode array to the third laser diode array comprises a plurality of light-emitting units arranged and spaced apart in a direction perpendicular to the first direction, each of the light-emitting units is an multiple laser diode chip package or two multiple laser diode chip packages, wherein the first light to the third light have the same wavelength.

23. The light source module according to claim 21, wherein the first laser diode array and the second laser diode array in a direction perpendicular to the first direction are staggered with the third laser diode array, or the first laser diode array and the third laser diode array in the direction perpendicular to the first direction are staggered with the second laser diode array.

24. The light source module according to claim 21 further comprising a reflective element, the reflective element disposed on a transmission path of the first light and configured to reflect the first light to the first light combiner, wherein the first laser diode array provides the first light in the second direction, the second laser diode array provides the second light in the second direction, and the third laser diode array provides the third light in the second direction.

25. The light source module according to claim 21, wherein the first arrangement direction is arranged at 45 degrees to the first direction, the second arrangement direction is perpendicular to the first direction and the second direction, or the first arrangement direction is perpendicular to the first direction and the second direction, and the second arrangement direction is arranged at 45 degrees to the first direction.

26. The light source module according to claim 21, wherein the first light to the third light from the second light combiner are transmitted to at least one optical lens element in a manner deviating from a central axis of the at least one optical lens.

* * * * *